(12) United States Patent
Ott

(10) Patent No.: US 12,496,429 B2
(45) Date of Patent: Dec. 16, 2025

(54) SYSTEMS AND METHODS FOR DELIVERING PRESSURIZED FLUID TO A TARGET SITE ALONE OR IN CONJUNCTION WITH THERAPEUTIC AGENTS

(71) Applicant: Cook Medical Technologies LLC, Bloomington, IN (US)

(72) Inventor: Andreas Ott, Limerick (IE)

(73) Assignee: COOK MEDICAL TECHNOLOGIES LLC, Bloomington, IN (US)

( * ) Notice: Subject to any disclaimer, the term of this patent is extended or adjusted under 35 U.S.C. 154(b) by 670 days.

(21) Appl. No.: 17/968,165

(22) Filed: Oct. 18, 2022

(65) Prior Publication Data

US 2024/0123183 A1    Apr. 18, 2024

(51) Int. Cl.
*A61M 5/20* (2006.01)
*A61M 25/00* (2006.01)

(52) U.S. Cl.
CPC .... *A61M 25/0026* (2013.01); *A61M 25/0067* (2013.01)

(58) Field of Classification Search
CPC ........... A61B 2017/00522; A61B 2017/00544; A61M 39/223; A61M 5/2053; A61M 5/30; F16K 11/0716
See application file for complete search history.

(56) References Cited

U.S. PATENT DOCUMENTS

| | | | |
|---|---|---|---|
| 39,678 A | 8/1863 | Russell | |
| 170,182 A | 11/1875 | Molesworth | |
| 280,202 A | 6/1883 | Mattson | |
| 442,785 A | 12/1890 | Schoettl | |
| 460,458 A | 9/1891 | Bates | |
| 471,865 A | 3/1892 | Howard | |
| 533,489 A | 2/1895 | Ogram | |

(Continued)

FOREIGN PATENT DOCUMENTS

| AU | 9382598 | 3/1999 |
|---|---|---|
| AU | 2009244462 | 11/2009 |

(Continued)

OTHER PUBLICATIONS

International Preliminary Report on Patentability and Written Opinion regarding PCT/US2022/036498 dated Jan. 25, 2024, 9 pages.

(Continued)

*Primary Examiner* — Deanna K Hall
(74) *Attorney, Agent, or Firm* — Vivacqua Crane, PLLC

(57) ABSTRACT

A system suitable for delivering a therapeutic agent to a target site includes: a container for holding a therapeutic agent; a pressure source having pressurized fluid, the pressure source in selective fluid communication with at least a portion of the container; a catheter in selective fluid communication with the container and configured for delivery of the therapeutic agent or delivery of the pressurized fluid without the therapeutic agent to a target site; a first valve connected between the pressure source and the container; and a housing configured to securely retain the container and rotationally support a button, wherein the button is configured to selectively actuate the first valve to deliver the therapeutic agent or deliver the pressurized fluid without the therapeutic agent.

20 Claims, 16 Drawing Sheets

(56) References Cited

U.S. PATENT DOCUMENTS

| | | |
|---|---|---|
| 566,411 A | 8/1896 | Schoene |
| 576,437 A | 2/1897 | Elliot |
| 693,587 A | 2/1902 | Campbell |
| 775,985 A | 11/1904 | McKain |
| 881,238 A | 3/1908 | Hasbrouck |
| 904,149 A | 11/1908 | Rachmann |
| 938,648 A | 11/1909 | DeVilbiss |
| 1,022,601 A | 4/1912 | Rumberg et al. |
| 1,114,114 A | 10/1914 | Cochenour |
| 1,145,520 A | 7/1915 | Smith |
| 1,261,503 A | 4/1918 | Figgis |
| 1,357,452 A | 11/1920 | Hall |
| 1,466,119 A | 8/1923 | Claflin |
| 1,521,396 A | 12/1924 | Scott |
| 1,685,280 A | 9/1928 | Findley |
| 1,934,793 A | 11/1933 | Crain et al. |
| 2,004,402 A | 6/1935 | Conklin |
| 2,151,418 A | 3/1939 | Bolte |
| 2,223,611 A | 12/1940 | Gross |
| 2,307,986 A | 1/1943 | Bolte et al. |
| 2,390,313 A | 12/1945 | Macgill |
| 2,507,702 A | 5/1950 | Fields |
| 2,519,555 A | 8/1950 | Fields |
| 2,609,155 A | 9/1952 | Fosnaugh |
| 2,632,444 A | 3/1953 | Kas |
| 2,805,013 A | 9/1957 | Cordis |
| 2,934,314 A | 4/1960 | Chambers et al. |
| 2,956,579 A | 10/1960 | Moore et al. |
| 3,016,895 A | 1/1962 | Sein et al. |
| 3,050,261 A | 8/1962 | Littlefield |
| 3,207,618 A | 9/1965 | De Hart |
| 3,506,008 A | 4/1970 | Huck |
| 3,540,444 A | 11/1970 | Moreland |
| 3,572,335 A | 3/1971 | Robinson |
| 3,589,363 A | 6/1971 | Banko et al. |
| 3,599,866 A | 8/1971 | Bolton |
| 3,632,046 A | 1/1972 | Hengesbach |
| 3,647,143 A | 3/1972 | Gauthier et al. |
| 3,649,299 A | 3/1972 | Sholl |
| 3,667,465 A | 6/1972 | Voss |
| 3,710,400 A | 1/1973 | Sparks |
| 3,742,955 A | 7/1973 | Battista et al. |
| 3,744,493 A | 7/1973 | Booher et al. |
| 3,762,410 A | 10/1973 | Bindel |
| 3,788,315 A | 1/1974 | Laurens |
| 3,815,595 A | 6/1974 | Bar |
| 3,900,022 A | 8/1975 | Widran |
| 3,916,896 A | 11/1975 | Ballard |
| 4,009,637 A | 3/1977 | Bittner |
| 4,017,007 A | 4/1977 | Riccio |
| 4,040,420 A | 8/1977 | Speer |
| 4,174,811 A | 11/1979 | Binder et al. |
| 4,184,258 A | 1/1980 | Barrington et al. |
| 4,204,539 A | 5/1980 | Van Brugge |
| 4,204,645 A | 5/1980 | Hopp |
| 4,210,140 A | 7/1980 | James et al. |
| 4,359,049 A | 11/1982 | Redl et al. |
| 4,391,276 A | 7/1983 | Lazarus et al. |
| 4,423,727 A | 1/1984 | Widran et al. |
| 4,427,450 A | 1/1984 | Kostansek |
| 4,427,650 A | 1/1984 | Stroetmann |
| 4,516,442 A | 5/1985 | Davis |
| 4,534,345 A | 8/1985 | Wetterlin |
| 4,539,716 A | 9/1985 | Bell |
| 4,552,556 A | 11/1985 | Urquhart et al. |
| 4,578,067 A | 3/1986 | Cruz, Jr. |
| 4,606,501 A | 8/1986 | Bate et al. |
| 4,620,847 A | 11/1986 | Shishov et al. |
| 4,631,055 A | 12/1986 | Redl et al. |
| 4,637,816 A | 1/1987 | Mann |
| H257 H | 4/1987 | Barditch et al. |
| 4,655,211 A | 4/1987 | Sakamoto et al. |
| 4,657,536 A | 4/1987 | Dorman |
| 4,735,616 A | 4/1988 | Eibl et al. |
| 4,738,658 A | 4/1988 | Magro et al. |
| 4,738,740 A | 4/1988 | Pinchuk |
| 4,752,466 A | 6/1988 | Saferstein et al. |
| 4,790,819 A | 12/1988 | Li et al. |
| 4,798,606 A | 1/1989 | Pinchuk |
| 4,803,977 A | 2/1989 | Kremer, Jr. |
| 4,846,405 A | 7/1989 | Zimmermann |
| 4,850,355 A | 7/1989 | Brooks et al. |
| D303,139 S | 8/1989 | Morgan |
| 4,872,450 A | 10/1989 | Austad |
| 4,874,368 A | 10/1989 | Miller et al. |
| 4,890,612 A | 1/1990 | Kensey |
| 4,900,303 A | 2/1990 | Lemelson |
| 4,902,278 A | 2/1990 | Maget et al. |
| 4,902,281 A | 2/1990 | Avoy |
| 4,927,410 A | 5/1990 | Kovacs |
| 4,929,246 A | 5/1990 | Sinofsky |
| 4,941,874 A | 7/1990 | Sandow et al. |
| 4,941,880 A | 7/1990 | Burns |
| 4,945,050 A | 7/1990 | Sanford et al. |
| 4,946,870 A | 8/1990 | Partain, III et al. |
| 4,950,234 A | 8/1990 | Fujioka et al. |
| 4,969,874 A | 11/1990 | Michel et al. |
| 4,978,336 A | 12/1990 | Capozzi et al. |
| 4,994,028 A | 2/1991 | Leonard et al. |
| 5,009,637 A | 4/1991 | Newman et al. |
| 5,015,580 A | 5/1991 | Christou et al. |
| 5,021,059 A | 6/1991 | Kensey et al. |
| 5,053,000 A | 10/1991 | Booth et al. |
| 5,059,187 A | 10/1991 | Sperry et al. |
| 5,061,180 A | 10/1991 | Wiele |
| 5,063,025 A | 11/1991 | Ito |
| 5,064,413 A | 11/1991 | McKinnon et al. |
| 5,106,370 A | 4/1992 | Stewart |
| 5,116,315 A | 5/1992 | Capozzi et al. |
| 5,120,657 A | 6/1992 | McCabe et al. |
| 5,129,825 A | 7/1992 | Discko, Jr. |
| 5,129,882 A | 7/1992 | Weldon et al. |
| 5,133,701 A | 7/1992 | Han |
| 5,135,484 A | 8/1992 | Wright |
| 5,141,515 A | 8/1992 | Eberbach |
| 5,147,292 A | 9/1992 | Kullas et al. |
| 5,149,655 A | 9/1992 | McCabe et al. |
| 5,165,604 A | 11/1992 | Copp, Jr. |
| 5,176,642 A | 1/1993 | Clement |
| 5,179,022 A | 1/1993 | Sanford et al. |
| D333,000 S | 2/1993 | Good et al. |
| 5,204,253 A | 4/1993 | Sanford et al. |
| 5,207,641 A | 5/1993 | Allton |
| 5,219,328 A | 6/1993 | Morse et al. |
| 5,226,567 A | 7/1993 | Sansalone |
| 5,226,877 A | 7/1993 | Epstein |
| RE34,365 E | 8/1993 | Theeuwes |
| 5,273,531 A | 12/1993 | Knoepfler |
| 5,292,309 A | 3/1994 | Van Tassel et al. |
| 5,310,407 A | 5/1994 | Casale |
| 5,312,331 A | 5/1994 | Knoepfler |
| 5,312,333 A | 5/1994 | Churinetz et al. |
| 5,328,459 A | 7/1994 | Laghi |
| 5,330,426 A | 7/1994 | Kriesel et al. |
| 5,337,740 A | 8/1994 | Armstrong et al. |
| 5,391,183 A | 2/1995 | Janzen et al. |
| 5,392,992 A | 2/1995 | Farnsteiner et al. |
| 5,395,326 A | 3/1995 | Haber et al. |
| 5,405,607 A | 4/1995 | Epstein |
| 5,415,631 A | 5/1995 | Churinetz et al. |
| 5,429,278 A | 7/1995 | Sansalone |
| 5,445,612 A | 8/1995 | Terakura et al. |
| 5,447,499 A | 9/1995 | Allaire et al. |
| 5,469,994 A | 11/1995 | Reh et al. |
| 5,470,311 A | 11/1995 | Setterstrom et al. |
| 5,484,403 A | 1/1996 | Yaokum et al. |
| 5,497,232 A | 3/1996 | Watano et al. |
| 5,503,623 A | 4/1996 | Tilton, Jr. |
| 5,513,630 A | 5/1996 | Century |
| 5,518,546 A | 5/1996 | Williams et al. |
| 5,520,658 A | 5/1996 | Holm |
| 5,520,667 A | 5/1996 | Roche |
| 5,538,162 A | 7/1996 | Reh et al. |
| 5,546,932 A | 8/1996 | Galli |

(56) References Cited

U.S. PATENT DOCUMENTS

| | | |
|---|---|---|
| 5,553,741 A | 9/1996 | Sancoff et al. |
| 5,558,646 A | 9/1996 | Roche |
| 5,582,596 A | 12/1996 | Fukunaga et al. |
| 5,584,807 A | 12/1996 | McCabe |
| 5,584,815 A | 12/1996 | Pawelka et al. |
| 5,594,987 A | 1/1997 | Century |
| 5,601,603 A | 2/1997 | Illi |
| 5,605,541 A | 2/1997 | Holm |
| 5,612,050 A | 3/1997 | Rowe et al. |
| 5,665,067 A | 9/1997 | Linder et al. |
| 5,697,947 A | 12/1997 | Wolf et al. |
| 5,707,402 A | 1/1998 | Heim |
| 5,749,968 A | 5/1998 | Melanson et al. |
| 5,759,171 A | 6/1998 | Coelho |
| 5,788,625 A | 8/1998 | Plouhar et al. |
| 5,865,796 A | 2/1999 | McCabe |
| 5,873,530 A | 2/1999 | Chizinsky |
| 5,882,332 A | 3/1999 | Wijay |
| 5,895,400 A | 4/1999 | Abela |
| 5,902,228 A | 5/1999 | Schulsinger et al. |
| 5,919,184 A | 7/1999 | Tilton, Jr. |
| 5,951,531 A | 9/1999 | Ferdman et al. |
| 6,007,515 A | 12/1999 | Epstein et al. |
| 6,013,050 A | 1/2000 | Bellhouse et al. |
| 6,021,776 A | 2/2000 | Allred et al. |
| 6,027,471 A | 2/2000 | Fallon et al. |
| 6,059,749 A | 5/2000 | Marx |
| 6,077,217 A | 6/2000 | Love et al. |
| 6,117,150 A | 9/2000 | Pingleton et al. |
| 6,123,070 A | 9/2000 | Bruna |
| 6,158,624 A | 12/2000 | Grigg et al. |
| 6,165,201 A | 12/2000 | Sawhney et al. |
| 6,368,300 B1 | 4/2002 | Fallon et al. |
| 6,394,975 B1 | 5/2002 | Epstein |
| 6,428,505 B1 | 8/2002 | Taylor |
| 6,454,786 B1 | 9/2002 | Holm et al. |
| 6,461,325 B1 | 10/2002 | Delmotte et al. |
| 6,461,361 B1 | 10/2002 | Epstein |
| 6,478,754 B1 | 11/2002 | Babeav |
| 6,537,246 B1 | 3/2003 | Unger et al. |
| 6,554,792 B2 | 4/2003 | Hughes et al. |
| 6,610,026 B2 | 8/2003 | Cragg et al. |
| 6,616,652 B1 | 9/2003 | Harper |
| 6,641,800 B1 | 11/2003 | Mistry et al. |
| 6,689,108 B2 | 2/2004 | Lavi et al. |
| 6,716,190 B1 | 4/2004 | Glines et al. |
| 6,723,067 B2 | 4/2004 | Nielson |
| 6,811,550 B2 | 11/2004 | Holland et al. |
| 6,843,388 B1 | 1/2005 | Hollars |
| 6,863,660 B2 | 3/2005 | Marx |
| 6,905,475 B2 | 6/2005 | Hauschild et al. |
| 6,913,596 B2 | 7/2005 | Davey |
| 6,939,324 B2 | 9/2005 | Gonnelli et al. |
| 7,101,862 B2 | 9/2006 | Chochrum et al. |
| 7,156,880 B2 | 1/2007 | Evans et al. |
| 7,178,744 B2 | 2/2007 | Tapphorn et al. |
| 7,182,748 B1 | 2/2007 | Potter et al. |
| 7,291,133 B1 | 11/2007 | Kindler et al. |
| 7,334,598 B1 | 2/2008 | Hollars |
| 7,455,248 B2 | 11/2008 | Kablik et al. |
| 7,534,449 B2 | 5/2009 | Saltzman et al. |
| 7,544,177 B2 | 6/2009 | Gertner |
| 7,547,292 B2 | 6/2009 | Sheldrake et al. |
| 7,588,171 B2 | 9/2009 | Reedy et al. |
| 7,632,245 B1 | 12/2009 | Cowan et al. |
| 7,648,083 B2 | 1/2010 | Hornsby et al. |
| 7,673,783 B2 | 3/2010 | Morgan et al. |
| 7,691,244 B2 | 4/2010 | Levitan et al. |
| 7,744,526 B2 | 6/2010 | McAlister et al. |
| 7,776,822 B2 | 8/2010 | Terman |
| 7,824,373 B2 | 11/2010 | Kim |
| 7,857,167 B1 | 12/2010 | Hollars |
| 7,914,517 B2 | 3/2011 | Baran et al. |
| 8,083,721 B2 | 12/2011 | Miller |
| 8,109,872 B2 | 2/2012 | Kennedy, II et al. |
| 8,118,772 B2 | 2/2012 | Ducharme |
| 8,118,777 B2 | 2/2012 | Ducharme et al. |
| 8,210,449 B2 | 7/2012 | Peterson et al. |
| 8,235,937 B2 | 8/2012 | Palasis et al. |
| 8,292,197 B2 | 10/2012 | Ballu et al. |
| 8,298,175 B2 | 10/2012 | Hirschel et al. |
| RE43,824 E | 11/2012 | Sheldrake et al. |
| 8,361,054 B2 | 1/2013 | Ducharme et al. |
| 8,372,092 B2 | 2/2013 | Gabel et al. |
| 8,418,775 B2 | 4/2013 | Blomet et al. |
| 8,523,821 B2 | 9/2013 | Miller |
| 8,721,582 B2 | 5/2014 | Ji |
| 8,728,032 B2 | 5/2014 | Ducharme et al. |
| 8,827,980 B2 | 9/2014 | Ji |
| 8,944,296 B2 | 2/2015 | Vogt et al. |
| 8,950,396 B2 | 2/2015 | Wachtel et al. |
| 9,101,744 B2 | 8/2015 | Ducharme |
| 9,205,207 B2 | 12/2015 | Ji |
| 9,205,240 B2 | 12/2015 | Greenhalgh et al. |
| 9,375,533 B2 | 6/2016 | Ducharme et al. |
| 9,393,583 B2 | 7/2016 | Tu |
| 9,474,915 B2 | 10/2016 | Gonzales et al. |
| 9,486,609 B2 | 11/2016 | Ross |
| 9,555,185 B2 | 1/2017 | Foster et al. |
| 9,629,966 B2 | 4/2017 | Ji |
| 9,837,931 B2 | 12/2017 | Luo et al. |
| 9,839,772 B2 | 12/2017 | Ducharme |
| 9,867,931 B2 | 1/2018 | Gittard |
| 9,895,527 B2 | 2/2018 | Spohn et al. |
| 9,907,456 B2 | 3/2018 | Miyoshi |
| 10,463,811 B2 | 11/2019 | Lee et al. |
| 10,542,868 B2 | 1/2020 | Gordon et al. |
| 10,610,665 B2 | 4/2020 | Krueger et al. |
| 10,806,853 B2 | 10/2020 | Gittard |
| 10,842,368 B2 | 11/2020 | Nave |
| 10,994,110 B2 | 5/2021 | Ducharme |
| 11,344,314 B2 | 5/2022 | Tal et al. |
| 11,766,546 B2 | 9/2023 | Pic et al. |
| 2001/0056256 A1 | 12/2001 | Hughes et al. |
| 2002/0165483 A1 | 11/2002 | Miller |
| 2002/0169416 A1 | 11/2002 | Gonnelli |
| 2003/0023202 A1 | 1/2003 | Nielson et al. |
| 2003/0032862 A1 | 2/2003 | Ota et al. |
| 2003/0069549 A1 | 4/2003 | Macmahon |
| 2003/0108511 A1 | 6/2003 | Sawhney |
| 2003/0170250 A1 | 9/2003 | Ezrin et al. |
| 2003/0181917 A1 | 9/2003 | Gertner |
| 2003/0216695 A1 | 11/2003 | Yang |
| 2004/0059283 A1 | 3/2004 | Kirwan et al. |
| 2004/0073863 A1 | 4/2004 | Mousley |
| 2004/0215135 A1 | 10/2004 | Sheldrake et al. |
| 2004/0262340 A1 | 12/2004 | Kress |
| 2005/0070848 A1 | 3/2005 | Kim et al. |
| 2005/0125002 A1 | 6/2005 | Baran et al. |
| 2005/0205087 A1 | 9/2005 | Kabik et al. |
| 2006/0002852 A1 | 1/2006 | Saltzman et al. |
| 2006/0028664 A1 | 2/2006 | Ono |
| 2006/0052295 A1 | 3/2006 | Terman |
| 2006/0100572 A1 | 5/2006 | DiMatteo et al. |
| 2006/0252993 A1 | 11/2006 | Freed |
| 2007/0005002 A1 | 1/2007 | Millman |
| 2007/0088317 A1 | 4/2007 | Hyde |
| 2007/0199824 A1 | 8/2007 | Hoerr et al. |
| 2007/0240989 A1 | 10/2007 | Levitan et al. |
| 2007/0241119 A1 | 10/2007 | Durkin et al. |
| 2008/0021374 A1 | 1/2008 | Kawata |
| 2008/0027272 A1 | 1/2008 | Kadykowski |
| 2008/0120992 A1 | 5/2008 | Levy et al. |
| 2008/0132891 A1 | 6/2008 | Nobis et al. |
| 2008/0287911 A1 | 11/2008 | El-Nounou et al. |
| 2009/0000615 A1 | 1/2009 | Pohlmann |
| 2009/0007904 A1 | 1/2009 | Schuster et al. |
| 2009/0030274 A1 | 1/2009 | Goldfarb et al. |
| 2009/0071470 A1 | 3/2009 | Abrams |
| 2009/0145982 A1 | 6/2009 | Blomet et al. |
| 2009/0155342 A1 | 6/2009 | Diegelmann et al. |
| 2009/0234227 A1 | 9/2009 | Punga |
| 2009/0234374 A1 | 9/2009 | Gabel et al. |
| 2009/0234380 A1 | 9/2009 | Gabel et al. |

(56) References Cited

U.S. PATENT DOCUMENTS

| | | |
|---|---|---|
| 2009/0240197 A1 | 9/2009 | Cowan et al. |
| 2009/0248056 A1 | 10/2009 | Gabel et al. |
| 2009/0281486 A1 | 11/2009 | Ducharme |
| 2009/0326453 A1 | 12/2009 | Adams et al. |
| 2010/0101579 A1 | 4/2010 | Levy et al. |
| 2010/0121261 A1 | 5/2010 | Kablik et al. |
| 2010/0137796 A1 | 6/2010 | Perry et al. |
| 2010/0160897 A1 | 6/2010 | Ducharme et al. |
| 2010/0191185 A1 | 7/2010 | Miller |
| 2010/0305505 A1 | 12/2010 | Ducharme et al. |
| 2011/0178495 A1 | 7/2011 | Ji |
| 2011/0272438 A1 | 11/2011 | Vogt et al. |
| 2012/0116296 A1 | 5/2012 | Ducharme et al. |
| 2012/0136301 A1 | 5/2012 | Miller |
| 2013/0046278 A1 | 2/2013 | Ji |
| 2013/0059113 A1 | 3/2013 | Hatton et al. |
| 2013/0100801 A1 | 4/2013 | Allan et al. |
| 2013/0104884 A1 | 5/2013 | Vazales et al. |
| 2013/0110080 A1 | 5/2013 | Ducharme |
| 2014/0200402 A1 | 7/2014 | Snoke et al. |
| 2014/0207097 A1 | 7/2014 | Ji |
| 2014/0248437 A1 | 9/2014 | Schroeder et al. |
| 2014/0271491 A1 | 9/2014 | Gittard et al. |
| 2014/0296806 A1 | 10/2014 | Williams et al. |
| 2014/0346257 A1 | 11/2014 | Reetz, III et al. |
| 2015/0216516 A1 | 8/2015 | Steffen |
| 2015/0306317 A1 | 10/2015 | Ducharme et al. |
| 2017/0224762 A1 | 8/2017 | McIntosh et al. |
| 2017/0232141 A1 | 8/2017 | Surti et al. |
| 2017/0265879 A1 | 9/2017 | Washburn, II et al. |
| 2017/0296221 A1 | 10/2017 | DiCaprio et al. |
| 2018/0001067 A1 | 1/2018 | Christakis et al. |
| 2018/0056052 A1 | 3/2018 | Swanson et al. |
| 2018/0099088 A1 | 4/2018 | Gittard |
| 2018/0161526 A1 | 6/2018 | Canner et al. |
| 2018/0193011 A1 | 7/2018 | Keene et al. |
| 2018/0193574 A1 | 7/2018 | Smith et al. |
| 2018/0221296 A1 | 8/2018 | Holekamp et al. |
| 2018/0344659 A1 | 12/2018 | Holekamp et al. |
| 2019/0008601 A1 | 1/2019 | Pereira et al. |
| 2019/0232030 A1 | 8/2019 | Pic et al. |
| 2019/0308213 A1 | 10/2019 | Mispel-Beyer |
| 2019/0322442 A1 | 10/2019 | Thomsen |
| 2019/0343980 A1 | 11/2019 | Gittard et al. |
| 2019/0351207 A1 | 11/2019 | Quan et al. |
| 2019/0388665 A1 | 12/2019 | Christakis et al. |
| 2020/0046213 A1 | 2/2020 | Bendory et al. |
| 2020/0060536 A1 | 2/2020 | Rylander et al. |
| 2020/0061310 A1 | 2/2020 | Goodman et al. |
| 2020/0100986 A1 | 4/2020 | Pic et al. |
| 2020/0101476 A1 | 4/2020 | Pic et al. |
| 2020/0222218 A1 | 7/2020 | Poulsen et al. |
| 2020/0397983 A1 | 12/2020 | Gittard |
| 2021/0022761 A1 | 1/2021 | Looper et al. |
| 2021/0106717 A1 | 4/2021 | Carruthers et al. |
| 2021/0161515 A1 | 6/2021 | Pic et al. |
| 2021/0162122 A1 | 6/2021 | Pic et al. |
| 2021/0187190 A1 | 6/2021 | Congdon et al. |
| 2021/0228852 A1 | 7/2021 | Ducharme |
| 2021/0275760 A1 | 9/2021 | Hunter et al. |
| 2021/0299400 A1 | 9/2021 | Cauche et al. |
| 2021/0346568 A1 | 11/2021 | Gittard et al. |
| 2021/0379302 A1 | 12/2021 | Sigmon et al. |
| 2022/0040006 A1 | 2/2022 | Surti et al. |
| 2023/0016512 A1 | 1/2023 | Slattery et al. |
| 2023/0390540 A1 | 12/2023 | Pic et al. |

FOREIGN PATENT DOCUMENTS

| | | |
|---|---|---|
| AU | 2009330505 | 6/2011 |
| AU | 2011202035 | 11/2011 |
| AU | 2010253997 | 12/2011 |
| AU | 2014237970 | 9/2015 |
| AU | 2014329827 | 4/2016 |
| BR | 112022023464.3 | 12/2022 |
| CA | 2194096 | 8/2005 |
| CA | 2723183 | 11/2009 |
| CA | 2747390 | 7/2010 |
| CA | 2751538 | 8/2010 |
| CA | 2763135 | 12/2010 |
| CA | 2585845 | 12/2012 |
| CA | 2925900 | 4/2015 |
| CA | 2737832 | 2/2016 |
| CH | 15244 A | 9/1897 |
| CH | 257250 A | 3/1949 |
| CN | 1010689555 A | 11/2007 |
| CN | 101820935 A | 9/2010 |
| CN | 105050630 A | 11/2015 |
| CN | 105792869 A | 7/2016 |
| CN | 201621061301.6 | 9/2016 |
| CN | 201820339550 | 3/2018 |
| CN | 110691615 A | 1/2020 |
| CN | 112546336 A | 3/2021 |
| CN | 113080819 A | 7/2021 |
| CN | 114514017 A | 5/2022 |
| CN | 115697176 A | 2/2023 |
| DE | 3024749 A1 | 2/1982 |
| DE | 3108918 A1 | 9/1982 |
| DE | 3613762 A1 | 11/1987 |
| DE | 69529495 | 3/2003 |
| DE | 69530843 | 6/2003 |
| DE | 10 2004 011 444 A1 | 9/2005 |
| DE | 60210063 | 5/2006 |
| DE | 602005005081 | 4/2008 |
| DE | 102010019222 | 11/2013 |
| EP | 308269 A1 | 3/1989 |
| EP | 0 692 273 | 1/1996 |
| EP | 0738498 A1 | 10/1996 |
| EP | 0690732 | 1/2003 |
| EP | 0767624 | 5/2003 |
| EP | 1293559 | 7/2005 |
| EP | 1550713 | 7/2005 |
| EP | 1365824 B1 | 3/2006 |
| EP | 1804926 | 2/2008 |
| EP | 2274039 | 1/2011 |
| EP | 2277577 | 1/2011 |
| EP | 2384871 | 11/2011 |
| EP | 2391411 | 12/2011 |
| EP | 2435114 | 4/2012 |
| EP | 2680912 | 8/2015 |
| EP | 2934629 | 10/2015 |
| EP | 2968651 | 1/2016 |
| EP | 3052168 | 5/2017 |
| EP | 3150240 | 5/2017 |
| EP | 2375960 | 10/2018 |
| EP | 3190981 | 11/2019 |
| EP | 3615094 | 3/2020 |
| EP | 4041196 | 8/2022 |
| EP | 4161346 | 4/2023 |
| FR | 2863503 | 12/2003 |
| FR | 2877240 | 1/2007 |
| GB | 10563 A | 12/1896 |
| GB | 1254534 A | 11/1971 |
| GB | 2300371 A | 11/1996 |
| GB | 0100756 | 3/2001 |
| JP | S4838435 U | 5/1973 |
| JP | S5667464 U | 6/1981 |
| JP | 4022109 B | 4/1992 |
| JP | 5-192404 | 8/1993 |
| JP | H08206229 | 8/1996 |
| JP | 1997-253032 | 9/1997 |
| JP | 10505253 | 5/1998 |
| JP | 10-508790 | 9/1998 |
| JP | 2001-520918 | 11/2001 |
| JP | 2002-028224 | 1/2002 |
| JP | 2003/024833 A | 1/2003 |
| JP | 2003-126026 | 5/2003 |
| JP | 2004/521677 | 7/2004 |
| JP | 2004-535246 | 11/2004 |
| JP | 2005270372 | 6/2005 |
| JP | 3719608 | 11/2005 |
| JP | 2007-529280 A | 10/2007 |
| JP | 2009-530051 | 8/2009 |
| JP | 2011/508588 | 3/2011 |

(56) References Cited

FOREIGN PATENT DOCUMENTS

| | | |
|---|---|---|
| JP | 2011-519679 A | 7/2011 |
| JP | 2011/235962 | 11/2011 |
| JP | 2012/513284 | 6/2012 |
| JP | 2012-5277974 | 11/2012 |
| JP | 5502801 | 5/2014 |
| JP | 5631332 | 11/2014 |
| JP | 5670439 | 12/2014 |
| JP | 2016/512069 A | 4/2016 |
| JP | 6047546 | 11/2016 |
| JP | 6552115 | 7/2019 |
| JP | 2020/517399 | 6/2020 |
| JP | 6715274 B2 | 7/2020 |
| JP | 6807742 | 12/2020 |
| JP | 2020 023110 | 2/2022 |
| JP | 2022/521497 A | 4/2022 |
| JP | 2022-551509 | 9/2022 |
| KR | 102387327 | 4/2022 |
| KR | 10-2023-0002873 | 5/2023 |
| SU | 978999 | 12/1982 |
| TW | 1719844 B | 2/2021 |
| WO | WO 1982/03545 | 10/1982 |
| WO | WO2008/023545 | 10/1982 |
| WO | WO1985/002346 | 6/1985 |
| WO | WO1992/020312 | 11/1992 |
| WO | WO1994/028798 | 12/1994 |
| WO | WO 1995/19799 | 7/1995 |
| WO | WO 1996/009085 | 3/1996 |
| WO | WO1996/025190 | 8/1996 |
| WO | WO 1996/00524 | 11/1996 |
| WO | WO1996/037245 | 11/1996 |
| WO | WO1996/040327 | 12/1996 |
| WO | WO1997/020585 | 6/1997 |
| WO | WO 1999/12595 | 3/1999 |
| WO | WO 1999/21599 | 5/1999 |
| WO | WO 02/055139 | 7/2002 |
| WO | WO2002/053014 | 7/2002 |
| WO | WO 2003/007797 A1 | 1/2003 |
| WO | WO2004/002551 | 1/2004 |
| WO | WO2004/073863 | 9/2004 |
| WO | WO2005/089472 | 9/2005 |
| WO | WO2005/100980 | 10/2005 |
| WO | WO 2006/048536 | 5/2006 |
| WO | WO 2006/090149 | 8/2006 |
| WO | WO 2007/112185 A1 | 10/2007 |
| WO | WO2008/008845 | 1/2008 |
| WO | WO 2009/088576 | 7/2009 |
| WO | WO2009/091549 | 7/2009 |
| WO | WO 2009/137438 | 11/2009 |
| WO | WO2009/137438 A2 | 11/2009 |
| WO | WO 2010//074949 | 7/2010 |
| WO | WO 2010/088146 | 8/2010 |
| WO | WO 2010/138703 | 12/2010 |
| WO | WO 2012/118466 | 9/2012 |
| WO | WO2013/093798 | 6/2013 |
| WO | WO 2014/099662 | 6/2014 |
| WO | WO 2014/149617 | 9/2014 |
| WO | WO 2015/050814 | 4/2015 |
| WO | WO2016/038593 A1 | 3/2016 |
| WO | WO 2016/111373 | 7/2016 |
| WO | WO 2017/006684 | 1/2017 |
| WO | WO 2017/028701 A1 | 2/2017 |
| WO | WO 2018/200695 | 1/2018 |
| WO | WO2018/200695 A1 | 1/2018 |
| WO | WO 2020/254447 | 12/2020 |
| WO | WO 2021/071751 | 4/2021 |
| WO | WO2021/071751 A1 | 4/2021 |
| WO | WO 2021/141791 A1 | 7/2021 |
| WO | WO 2021/247850 | 12/2021 |
| WO | WO2021/247850 A1 | 12/2021 |
| WO | WO2021/287654 A1 | 1/2023 |
| WO | WO 2023/076076 A1 | 5/2023 |

OTHER PUBLICATIONS

Office Action in Japanese Patent Application No. 2022-570158, dated Nov. 17, 2023 (9 pages).
Machine Translation of JP 1997-253032 (21 pages).
Hemospray® Endoscopic Hemostat: https://www/cookmedical.com/products/35a4a7f2-867b-4c81-a983-44ea06277852/; 5 pages, date downloaded Sep. 30, 2020.
Cardinal IP Services, "Prevention of Spray Activation During System Closure" (DN-9175) Patentability Search of Disclosure, 13 pages, dated Sep. 30, 2020.
Cardinal IP Services, "Water Ingress Prevention Via Positive (Active/Passive) Air Flow" (DN-9171 and DN-9184) Patentability Search of Disclosure, 15 pages, dated Jan. 13, 2021.
Cardinal IP Services, "Preventing Accidental Powder Deployment" (DN- 9387) Patentability Search of Disclosure, 9 pages, dated Nov. 9, 2021.
Cardinal IP Services, "Positive Pressure Delivery Mechanism for a Therapeutic Agent Delivery Device" (DN-9347) Patentability Search of Disclosure, 13 pages, dated Oct. 12, 2021.
Cardinal IP Services, "Catheter Distal End Features to Prevent Lens Irrigation Fluid Ingress" (DN-9378) Patentability Search of Disclosure, 16 pages, dated Nov. 5, 2021.
Cardinal IP Services, "Device That Allows For Cleaning of Catheter and Camera Lens on Endoscope Distal Tip" (DN-9495) Patentability Search of Disclosure, 11 pages, dated Jan. 3, 2022.
PCT International Search Report in related Application No. PCT/US2022/036498 dated Oct. 27, 2022 (41 pages).
Partial European Search Report in EP Application No. 23214435.2, dated Apr. 23, 2024 (14 pages).
Medgadget, Convesaid, *A Hemostat Powder Spray That Can't Cause Embolisms*, (Team Consulting) Mar. 16, 2018 (4 pages).
International Preliminary Report on Patentability in PCT Application No. PCT/U82022/047013, dated Apr. 30, 2024 (12 pages).
Partial European Search Report in EP Application No. 23204400.8, dated Mar. 18, 2024 (17 pages).
Office Action dated Aug. 4, 2010 for U.S. Appl. No. 12/435,574, 7 pgs.
Response to Office Action for U.S. Appl. No. 12/435,574 filed Nov. 3, 2010, 10 pgs.
Office Action dated Feb. 17, 2011 for U.S. Appl. No. 12/435,574, 8 pgs.
Response to Office Action for U.S. Appl. No. 12/435,574 filed May 13, 2011, 11 pgs.
Office Action dated Aug. 22, 2011 for U.S. Appl. No. 12/435,574, 9 pgs.
Response to Office Action for U.S. Appl. No. 12/435,574 filed Nov. 22, 2011, 10 pgs.
Office Action dated Mar. 30, 2012 for U.S. Appl. No. 12/435,574, 9 pgs.
Response to Office Action for U.S. Appl. No. 12/435,574 filed Aug. 30, 2012, 11 pgs.
Restriction Requirement dated May 25, 2012 for U.S. Appl. No. 12/633,027, 7 pgs.
Response to Restriction Requirement filed Jul. 2, 2012 for U.S. Appl. No. 12/633,027, 7 pgs.
Office Action dated Apr. 14, 2011 for U.S. Appl. No. 12/787,796, 9 pgs.
Response to Office Action filed Jul. 14, 2011 for U.S. Appl. No. 12/787,796, 11 pgs.
Notice of Allowance dated Oct. 18, 2011 for U.S. Appl. No. 12/787,796, 10 pgs.
International Search Report and Written Opinion for PCT/US2009/067076, mailed Apr. 14, 2010, 23 pgs.
International Search Report and Written Opinion for PCT/US2010/036381, mailed Aug. 20, 2010, 16 pgs.
International Preliminary Report on Patentability for PCT/US2009/042781, mailed Nov. 18, 2010, 10 pgs.
International Search Report completed Sep. 22, 2009 for PCT/US2009/042781, 7 pgs.
Alto Shooter Catalog, Kaigen, English and Japanese, Jun. 1994, 8 pgs.

(56) References Cited

OTHER PUBLICATIONS

Decker, "An Efficient Method For The Application Of Avitene Hemostatic Agent", Surgery, Gynecology & Obstetrics, 1991, vol. 172, No. 6, 2 pgs.
Endo-Avitene™ Brochure "Microfibrillar Collagen Hemostat in an Endoscopic Delivery System", from MedChem Products, 4 pgs, 1992.
Fagelman, et al. "A Simple Method For Application Of Microfibrilar Colagen", Surgery, Gynecology & Obstetrics, Jun. 1980, vol. 150, No. 6, 3 pgs.
Hoshino, et al. "Trans-endoscopic Drug Propulsion Therapy", Diagnostic Endoscopy, 1993, vol. 5, 6 pgs.
Surgical Armamentarium, Copyright 1973 V. Mueller, 3 pgs.
Hoshino, "Transendoscopic Projectile Drug Delivery", Gastroenterologia Japonica, vol. 25, No. 5, Jun. 15, 1990, 1 page.
Park et al., "A randomized comparison of a new flexible bipolar hemostasis forceps designed principally for NOTES versus a conventional surgical laparoscopic bipolar forceps for intra-abdominal vessel sealing in a porcine model", Gastrointestinal Endoscopy 2010, vol. 71, No. 4, pp. 835-841.
Fritscher-Ravens et al., "Beyond NOTES: randomized controlled study of different methods of flexible endoscopic hemostasis of artifically induced hemorrhage, via NOTES access to the peritoneal cavity", Endoscopy 2009, vol. 41, pp. 29-35.
Final Office Action for U.S. Appl. No. 12/435,574 mailed Feb. 17, 2011, 8 pgs.
Examiner Interview Summary for U.S. Appl. No. 12/435,574 dated Jun. 10, 2011, 3 pgs.
Notice of Appeal for U.S. Appl. No. 12/435,574, filed Aug. 17, 2011, 1 pg.
Notice of Allowance dated Oct. 5, 2012 for U.S. Appl. No. 12/633,027, 9 pgs.
International Preliminary Report on Patentability for PCT/US2009/067076 issued Jun. 29, 2011, 12 pgs.
International Preliminary Report on Patentability for PCT/US2010/036381 issued Nov. 29, 2011, 7 pgs.
Examination Report for Australian Patent Application No. 2009244462 issued Sep. 27, 2012; 4 pgs.
Response to Examination Report for Australian Patent Application No. 2009244462 filed Feb. 19, 2013; 8 pgs.
Examination Report for Canadian Patent Application No. 2,723,183 issued Aug. 17, 2012, 2 pgs.
Response to Examination Report for Canadian Patent Application No. 2,723,183 filed Feb. 11, 2013, 5 pgs.
Examination Report for European Patent Application No. 09743424.5 issued Nov. 14, 2011, 5 pgs.
Response to Examination Report for European Patent Application No. 09743424.5 filed Mar. 14, 2012, 10 pgs.
Examination Report for European Patent Application No. 09743424.5 issued Sep. 5, 2012, 6 pgs.
Response to Examination Report for European Patent Application No. 09743424.5 filed Feb. 22, 2013, 4 pgs.
Office Action for U.S. Appl. No. 13/351,524 issued Oct. 18, 2012, 14 pgs.
Examiner Interview Summary for U.S. Appl. No. 13/351,524 issued Feb. 8, 2013, 4 pgs.
Response to Office Action for U.S. Appl. No. 13/351,524, filed Feb. 12, 2013, 9 pgs.
First Australian Examination Report for related AU Application No. 2014329827, dated Aug. 29, 2016, 4 pqs.
Reply to First Australian Examination Report for related AU Application No. 2014329827, dated Nov. 10, 2016, 16 pqs.
Notice of Acceptance For Patent Application for related AU Application No. 2014329827, dated Dec. 12, 2016, 3 pgs.
Canadian Examination Report for related CA Application No. 2,925,900, dated Feb. 23, 2017, 4 pgs.
European Communication Pursuant to Rule 161 (1) and 162 for related EP Application No. 14789657.5, dated May 11, 2016, 2 pgs.
Reply To European Communication Report, dated Nov. 10, 2016, 8 pgs.
PCT International Search Report and Written Opinion for related Application No. PCT/US2014/058016, dated Apr. 21, 2015, 15 pgs.
Office Action for JP2016-520011 dated May 2, 2017, 7 pgs. Including English translation.
John Chadwick, Particle Size Control in Aerosol Packages, Dec. 2004, Aerosol Technical Solutions, pp. 1-3.
Response to Examiner's Report in Canadian Application No. 2,925,900, dated Aug. 23, 2017, 6 pages.
Notice of Allowance in Canadian Application No. 2,925,900, dated Dec. 1, 2017, 1 page.
Office Action/Notification of Reason for Rejection in Japanese Application No. 2016-520011 dated Apr. 24, 2018, including English translation, 7 pages.
Office Action in Chinese Application No. 201480065570.7 dated Jun. 22, 2018, including English translation, 21 pages.
Response to Office Action for Chinese Application No. 201480065570.7 filed Oct. 5, 2018, including English translation, 6 pgs.
Response to Office Action for Canadian Application No. 2,925,900 filed Aug. 23, 2017, 32 pgs.
Response to Office Action for Japanese Application No. 2016-520011 filed Nov. 1, 2017, 11 pgs.
Response to Office Action for Japanese Application No. 2016-520011 filed Oct. 23, 2018, 3 pgs.
Office Action for EP 13818576.4 issued Oct. 9, 2018, 6 pgs.
Second Office Action for CN201480065570.7 dated Mar. 11, 2019, 7 pages.
Office Action for Japanese Patent Application 2016-520011 dated Apr. 2, 2019, 5 pgs. including English translation.
Response to Office Action for Japanese Patent Application 2014-80065570.7 filed May 22, 2019, 11 pgs.
Intent to Grant for European Application 14 789 657.5 dated Jun. 17, 2019, 35 pgs.
Third Office Action for Chinese Patent Application No. 201480065570.7 dated Sep. 25, 2019, 14 pgs. includin English translation.
Office Action for Japanese Patent Application Serial No. 2016-520011 (Appeal No. 2019-01025), dated Jun. 24, 2020, 8 pgs; including English translation.
Office Action for Chinese Patent Application filing No. 201480065570.7 dated Apr. 3, 2020, 7 pgs. including English translation.
Notice of Opposition for European Patent Application No. 14789657.5 dated Aug. 26, 2020, 28 pgs.
ASTM, "ASTM E2651-10, Standard Guide for Powder Particle Size Analysis", West Conshohocken, PA, USA: ASTM International, 2010.
Muzzio , F.J. et al., "Sampling and characterization of pharmaceutical powders and ranular blends", International Journal of Pharmaceutics , vol. 250, No. 51-64, 2003.
Kuchling, H., "Taischenbuch der Physik", Fachbuchverlag Leipzig GmbH, 1995, Ed. 15: pp. 166-169; 9 pages including English translation.
Kibbe , A.H. et al., "Lactose. In: R.C. Rowe et al. (eds). Handbook of Pharmaceutical Excipients", London: Pharmaceutical Press, 2003: pp. 323-332.
National Geographic Area Coordination Center, "'Weed Washer' What is a Micron? (Micron v/s Mesh). Reference: Mesh Micron Conversion Chart", [cited Jun. 8, 2020] Available from: [https://gacc.nifc.gov/nrcc/dispatch/equipment_supplies/agree-contract/forms/MicronMeshpdf].
Mortazavi, S.M.J., "Development of a Novel Mineral Based Haemostatic Agent Consisting of a Combination of Bentonite and Zeolite Minerals", J Ayub Med Coll Abbottabad , vol. 21 (1), 2009.
ChemicalBook Inc., "Chemical Book, CAS DataBase List, Bentonite", CAS No. 1302-78-9 II , [cited Jun. 8, 2020] Available from: [https://www.chemicalbook.com/CASEN_1302-78-9.htm].
Kesavan, J. et al., "Density Measurements of Materials used in Aerosol Studies", Edgewood, 2000.
Arefnia, A. et al., "Comparative Study on the Effect of Tire-Derived Aggregate on Specific Gravity of Kaolin", Electronic Journal of Geotechnical Engineering , vol. 18(8), Jan. 2013: pp. 335-344.
Wikipedia, "Wikipedia. Amoxicillin", [cited Jun. 8, 2020] Available from: https://en.wikipedia.org/wiki/Amoxicillin.

(56) References Cited

OTHER PUBLICATIONS

ChemicalBook Inc., "Chemical Book. Norfloxacin", [cited Jun. 8, 2020] Available from: [https://www.chemicalbook.com/Chemical ProductProperty_US_CB1711035.aspx].
Wong Kee Song, L.-M. et al., "Emerging technologies for endoscopic hemostasis", Gastrointest. Endosc., vol. 75(5), May 2012: pp. 933-937.
Bridevaux, et al. "Short-term safety of thoracoscopic talc pleurodesis for recurrent primary spontaneous pneumothorax; a prospective European multicentre study" Eur Respir J 2011; 38: 770-773. (Year: 2011).
International Preliminary Report on Patentability in PCT Application No. PCT/US/2014/058016, dated Oct. 2, 2013 (12 pages).
Reexamination Request in Chinese Appiication No. 201480065570.7, dated Jul. 3, 2020 (10 pages).
Notice of Allowance in Chinese Application No. 201480065570.7, dated Aug. 12, 2020 (4 pages).
Response to Office Action in European Application No. 14789657.5, dated Mar. 22, 2021 (85 Pages).
Response to Office Action in Japanese Application No. 2016-520011, dated Sep. 15, 2020 (4 pages).
Decision on Appeal in Japanese Application No. 2016-520011, dated Nov. 10, 2020 (4 pages).
Summons to Attend Oral Proceedings in European Application No. 14789657.5, dated Aug. 26, 2021 (13 pages).
PCT Invitation to Pay Additional Fees in Related Application No. PCT/US02021/035682 dated Oct. 12, 2021 (16 pages).
First Office Action and English Translation in Chinese Application No. 2018800357848, dated Jun. 9, 2021 (9 pages).
Response to First Office Action in Chinese Application No. 2018800357848, dated Sep. 17, 2021 (12 pages).
Second Office Action and English Translation in Chinese Application No. 2018800357848, dated Dec. 1, 2021 (8 pages).
Response to Second Office Action in Chinese Application No. 2018800357848, dated Mar. 29, 2022 (9 pages).
Third Office Action and English Translation in Chinese Application No. 2018800357848, dated Mar. 29, 2022 (9 pages).
Response to Examination Report in European Application No. 18724076.7, dated Feb. 25, 2022 (12 pages).
Written Submissions in European Application No. 14789657.5 filed Jan. 7, 2022 (51 pages).
Opponent's Written Submissions in European Application No. 14789657.5 filed Jan. 18, 2022 (25 pages).
First Office Action in Chinese Patent Application No. 2020111614040 dated Mar. 21, 2022 (15 pages).
International Search Report and Written Opinion of the International Searching Authority dated Dec. 3, 2021 in International Application No. PCT/US2021/035682 (22 pages).
Communication and Written Opinion dated Jan. 13, 2023 in European Application No. 21736099.9 (14 pages).
Patentability Search: "Review of Cook's Hemostatic and Mucoadhesive Patents" dated Feb. 14, 2023 (32 pages).
Patentability Search of Disclosure Entitled "Device That Reduces Fluid Ingress in the Catheter" (DN-9596) Prepared by Cardinal IP Services, dated Aug. 24, 2022 (12 pages).
Invitation to Pay Additional Fee and, Where Applicable, Protest Fee in PCT Application Serial No. PCT/US2022/047013, dated Feb. 6, 2023 (13 pages).
Hemospray Endoscopic Hemostat Brochure, Cook, Jun. 2018 ESC-D43196-EN-F.
International Preliminary Report on Patentability in PCT Application No. PCT/US/2021/035682, dated Dec. 6, 2022 (13 pages).
International Search Report and The Written Opinion of the International Searching Authority, dated Mar. 27, 2023 (20 pages).
Japanese Decision of Refusal and English Translation of the Office Action Regarding 2022-570158, dated Jul. 23, 2024 (5 pages).
Office Action for Japanese Patent Application No. 2011-508588, dated Mar. 25, 2014 (6 pages) including English Translation.
Office Action for Japanese Patent Application No. 2011-508588, dated Jun. 12, 2013 (6 pages) including English Translation.
Response to Office Action dated October 10, 2013 for Japanese Patent Application No. 2011-508588 (3 pages).
Examination Report from European Patent Office dated Nov. 28, 2013 for European Patent Application No. 09743424.5 (6 pages).
Examiner's Report dated Aug. 17, 2012 for Canadian Patent Application No. 2723183 (2 pages).
Response to Examiner's Report dated Feb. 11, 2013 for Canadian Patent Application No. 2723183 (5 pages).
Notice of Allowance dated Jul. 31, 2013 for Canadian Patent Application No. 2723183 (1 page).
Notice of Acceptance dated Apr. 2, 2013 for Australian Patent Application No. 2009244462 (3 pages).
Certificate of Grant dated Jul. 25, 2013 for Australian Patent Application No. 2009244462 (1 page)
Office Action dated Oct. 2, 2014 for U.S. Appl. No. 12/435,574 (10 pages).
Response to Office Action filed Feb. 24, 2015 for U.S. Appl. No. 12/435,574 (18 pages).
Office Action dated Jun. 12, 2015 for U.S. Appl. No. 12/435,574 (10 pages).
Response to Office Action filed Oct. 6, 2015 for U.S. Appl. No. 12/435,574 (19 pages).
Office Action dated Jun. 1, 2016 for U.S. Appl. No. 12/435,574 (13 pages).
Response to Office Action filed Aug. 2, 2016 for U.S. Appl. No. 12/435,574 (13 pages).
Office Action dated Nov. 15, 2016 for U.S. Appl. No. 12/435,574 (15 pages).
Notice of Allowance dated Aug. 10, 2017 for U.S. Appl. No. 12/435,574 (9 pages).
PCT International Search Report and Written Opinion for PCT/US2009/042781, mailed Dec. 7, 2009 (16 pages).
Final Rejection for U.S. Appl. No. 13/351,524 issued Jun. 14, 2013 (12 pages).
RCE and Amendment for U.S. Appl. No. 13/351,524, filed Dec. 13, 2013 (10 pages).
Notice of Allowance for U.S. Appl. No. 13/351,524 issued Jan. 17, 2014 (9 pages).
Examination Report No. 1 for Australian Patent Application No. 2010253997 dated Mar. 15, 2013 (3 pages).
Examiner's Report for Canadian Patent Application 2,763,135 issued May 27, 2013 (3 pages).
Response to Examiner's Report for Canadian Patent Application No. 2,763,135 filed Nov. 27, 2013 (8 pages).
Communication for European Patent Application 10722265.5 dated Jan. 27, 2012 (2 pages).
Reply to Communication for European Patent Application No. 10722265.5 filed Jul. 27, 2012 (18 pages).
International Search Report and Written Opinion for PCT/US2013/075005 dated May 2, 2014 (13 pages).
Office Action dated Oct. 7, 2013 for U.S. Appl. No. 13/725,206, 8 pgs.
Response to Office Action filed Feb. 6, 2014 for U.S. Appl. No. 13/725,206, 8 pgs.
Office Action dated May 29, 2014 for U.S. Appl. No. 13/725,206, 10 pgs.
Pre-Appeal Brief Request for Review filed Oct. 28, 2014for U.S. Appl. No. 13/725,206, 7 pgs.
Notice of Panel Decision dated Nov. 25, 2014 for U.S. Appl. No. 13/725,206, 2 pgs.
Amendment and Response After Final filed Jan. 26, 2015 for U.S. Appl. No. 13/725,206, 9 pgs.
Advisory Action dated Feb. 13, 2015 for U.S. Appl. No. 13/725,206, 3 pgs.
Amendment and Response After Final filed Mar. 30, 2015 for U.S. Appl. No. 13/725,206, 8 pgs.
Notice of Allowance dated Apr. 9, 2015 for U.S. Appl. No. 13/725,206, 8 pgs.
Communication Pursuant to Rules 161(1) and 162 EPC for EP013818576.4, dated Aug. 12, 2015 (2 pages).
Notification of Reason for Rejection, including English translation, in P2014-254907 dated Feb. 9, 2016 (6 Pages).

(56) References Cited

OTHER PUBLICATIONS

Office Action in European Application No. 22802397 dated Jun. 5, 2024 (23 pages).
Final Office Action in U.S. Appl. No. 17/227,635 dated Aug. 30, 2024 (39 pages).
Final Office Action in U.S. Appl. No. 18/143,844 dated Sep. 4, 2024 68 pages.
Extended European Search Report in European Application No. 23214435.2, dated Aug. 5, 2024 14 pages.
Notice of Allowance in U.S. Appl. No. 17/338,198, dated Sep. 9, 2024 (10 pages).

FIG. 2
FIG. 3
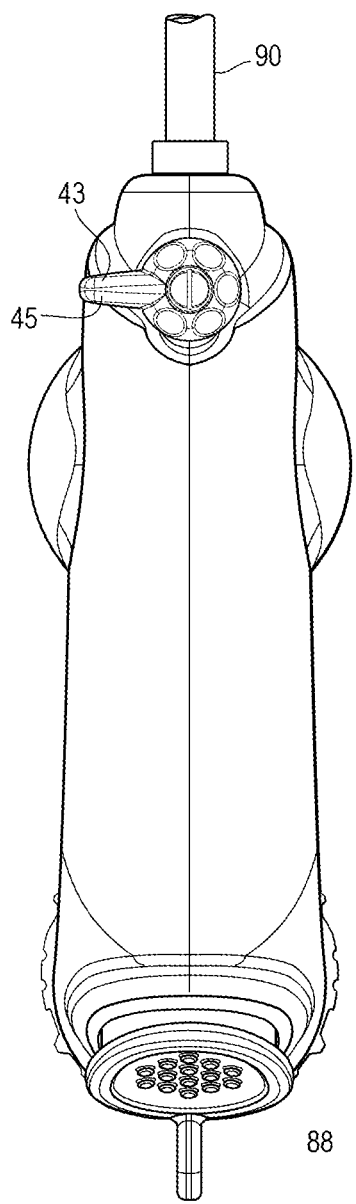
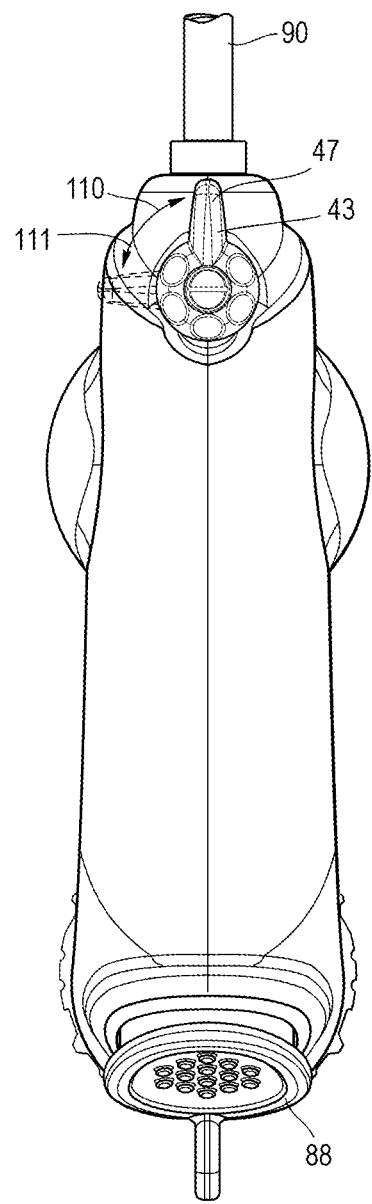

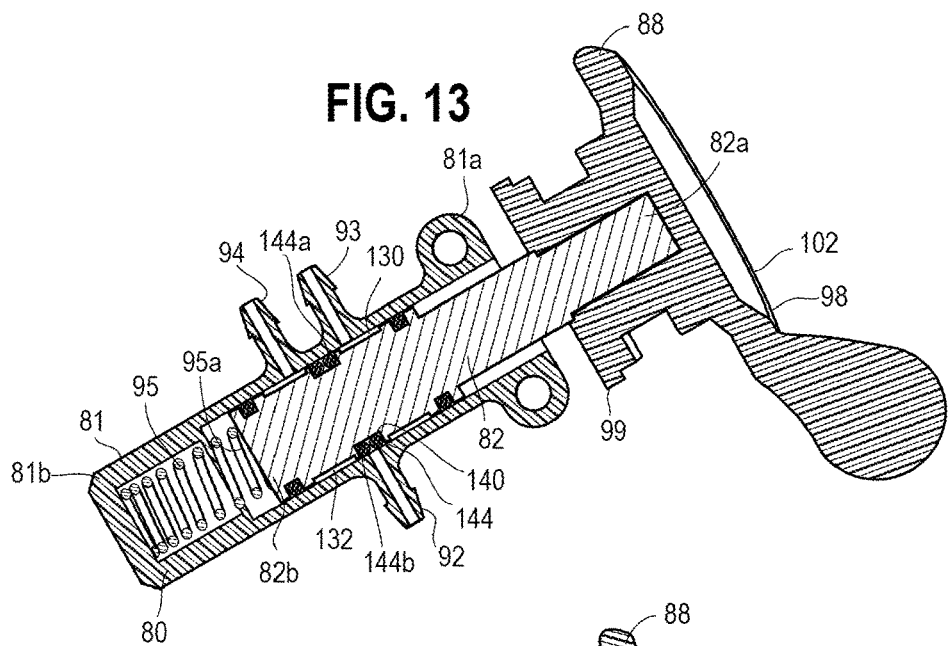
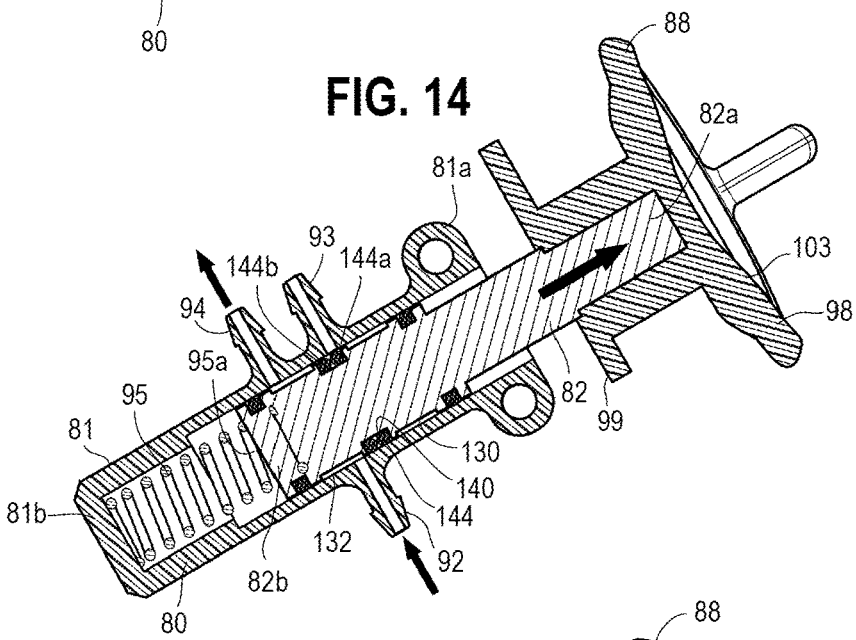
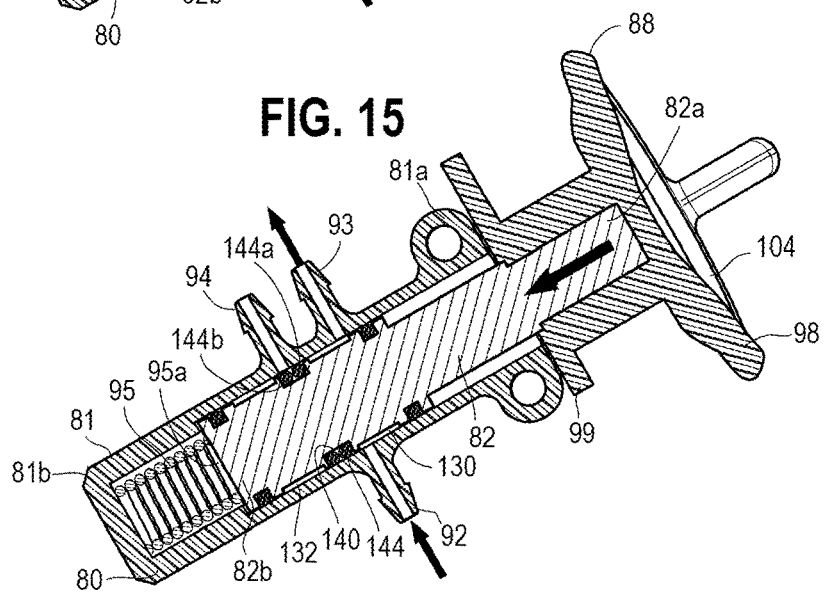

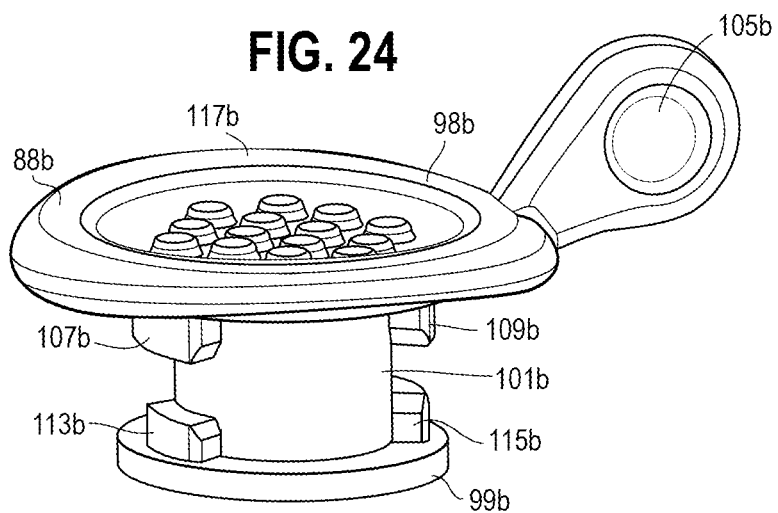
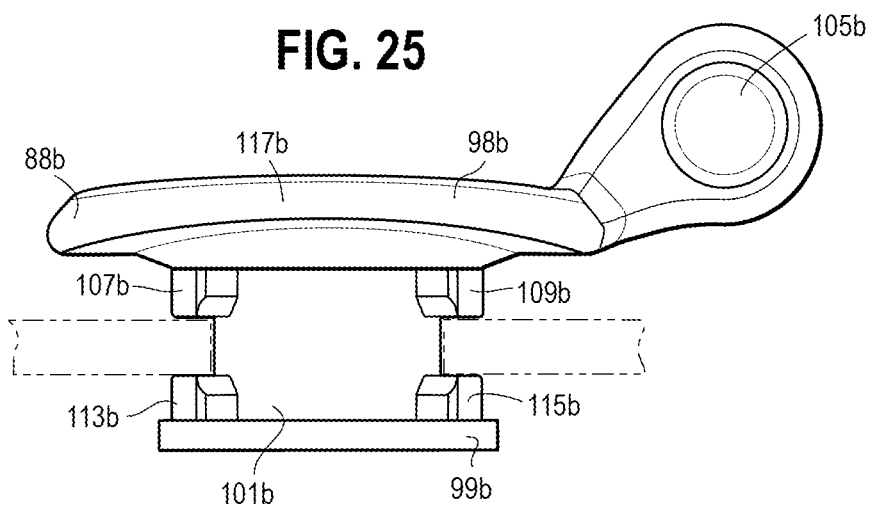
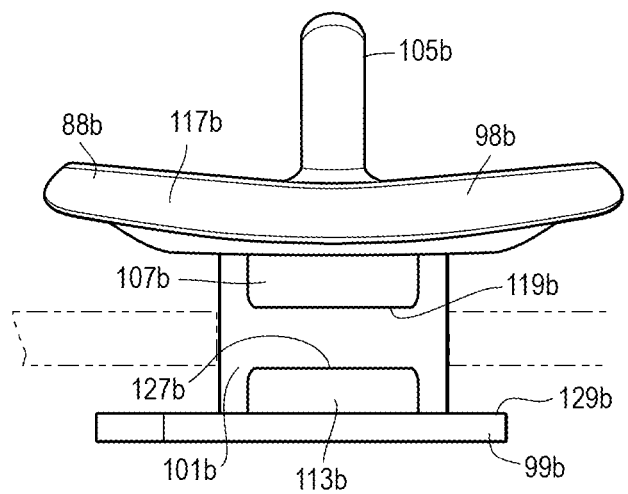

SYSTEMS AND METHODS FOR DELIVERING PRESSURIZED FLUID TO A TARGET SITE ALONE OR IN CONJUNCTION WITH THERAPEUTIC AGENTS

BACKGROUND

The present embodiments relate generally to medical devices, and more particularly, to medical devices for delivering therapeutic agents to a target site.

There are several instances in which it may become desirable to introduce therapeutic agents into the human or animal body. For example, therapeutic drugs or bioactive materials may be introduced to achieve a biological effect. The biological effect may include an array of targeted results, such as inducing hemostasis, sealing perforations, reducing restenosis likelihood, or treating cancerous tumors or other diseases.

Many of such therapeutic agents are injected using an intravenous (IV) technique and via oral medicine. While such techniques permit the general introduction of medicine, in many instances it may be desirable to provide localized or targeted delivery of therapeutic agents, which may allow for the guided and precise delivery of agents to selected target sites. For example, localized delivery of therapeutic agents to a tumor may reduce the exposure of the therapeutic agents to normal, healthy tissues, which may reduce potentially harmful side effects.

Localized delivery of therapeutic agents has been performed using catheters and similar introducer devices. By way of example, a catheter may be advanced towards a target site within the patient, then the therapeutic agent may be injected through a lumen of the catheter to the target site. Typically, a syringe or similar device may be used to inject the therapeutic agent into the lumen of the catheter. However, such a delivery technique may result in a relatively weak stream of the injected therapeutic agent.

Moreover, it may be difficult or impossible to deliver therapeutic agents in a targeted manner in certain forms, such as a powder form, to a desired site. For example, if a therapeutic powder is held within a syringe or other container, it may not be easily delivered through a catheter to a target site in a localized manner that may also reduce potentially harmful side effects.

SUMMARY

One general aspect of the present disclosure includes a system suitable for delivering a therapeutic agent to a target site, the system including: a container for holding a therapeutic agent; a pressure source having pressurized fluid, the pressure source in selective fluid communication with at least a portion of the container; a catheter in selective fluid communication with the container and configured for delivery of the therapeutic agent or the pressurized fluid to a target site; a first valve connected between the pressure source and the container; and a button configured to selectively activate the first valve to deliver the therapeutic agent or the pressurized fluid without the therapeutic agent, where the button is movable among a first position, a second position, and a third position, where when the button is in the first position, the first valve is configured to prevent delivery of the therapeutic agent through the catheter and prevent delivery of the pressurized fluid through the catheter, where rotation of the button allows the first valve to move the button to the second position, which allows delivery of the pressurized fluid without the therapeutic agent through the catheter, and where when the button is in the third position, the first valve is configured to allow delivery of the therapeutic agent through the catheter.

Another general aspect of the present disclosure includes a system suitable for delivering a therapeutic agent to a target site, the system including: a container for holding a therapeutic agent; a pressure source having pressurized fluid, the pressure source in selective fluid communication with at least a portion of the container; a catheter in selective fluid communication with the container and configured for delivery of the therapeutic agent or the pressurized fluid to a target site; and a button configured to move between a default state and an activated state, where when the button is in the default state, delivery of the therapeutic agent and delivery of the pressurized fluid both are not allowed by pressing the button, and where when the button is in the activated state, the button is configured to selectively allow delivery of the pressurized fluid without the therapeutic agent or delivery of the therapeutic agent.

Another general aspect of the present disclosure includes a method suitable for delivering a therapeutic agent to a target site, the method including: actuating a pressure source having pressurized fluid, the pressure source in selective fluid communication with at least a portion of a container that holds a therapeutic agent; rotating a button to actuate a first valve such that the pressurized fluid flows through the first valve and into a catheter absent delivery of the therapeutic agent, the first valve being connected between the pressure source and the container, and the catheter in selective fluid communication with the container and configured for delivery of the pressurized fluid or the therapeutic agent to a target site; and depressing the button to actuate the first valve to allow the pressurized fluid to flow through the first valve and into the container.

Another general aspect of the present disclosure includes a system suitable for delivering a therapeutic agent to a target site, the system including: a container for holding a therapeutic agent; a pressure source having pressurized fluid, the pressure source in selective fluid communication with at least a portion of the container; a catheter in selective fluid communication with the container and configured for delivery of the therapeutic agent or delivery of the pressurized fluid without the therapeutic agent to a target site; a first valve connected between the pressure source and the container; and a housing configured to securely retain the container and rotationally support a button, wherein the button is configured to selectively actuate the first valve to deliver the therapeutic agent or deliver the pressurized fluid without the therapeutic agent.

A system/method according to the present disclosure may include any combination of the features described above and/or the original as-filed claims.

Other systems, methods, features and advantages of the invention will be, or will become, apparent to one with skill in the art upon examination of the following figures and detailed description. It is intended that all such additional systems, methods, features and advantages be within the scope of the invention.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like referenced numerals designate corresponding parts throughout the different views.

FIG. 2 is another perspective view of the system of FIG. 1, showing the front valve in a first state and the button in a default state (first position).

FIG. 3 is another perspective view of the system of FIG. 1, showing the front valve in a second state and the button in the default state.

FIG. 13 is an enlarged cross-sectional view of the back valve and the button, showing the button in the first position.

FIG. 14 is an enlarged cross-sectional view of the back valve and the button, showing the button in the second position.

FIG. 15 is an enlarged cross-sectional view of the back valve and the button, showing the button in the third position.

FIGS. 24 and 25 are perspective views of the button of FIG. 1 in accordance with another embodiment.

FIG. 26 is a side view of the button of FIG. 24.

DETAILED DESCRIPTION OF THE PREFERRED EMBODIMENT

Figure 1:
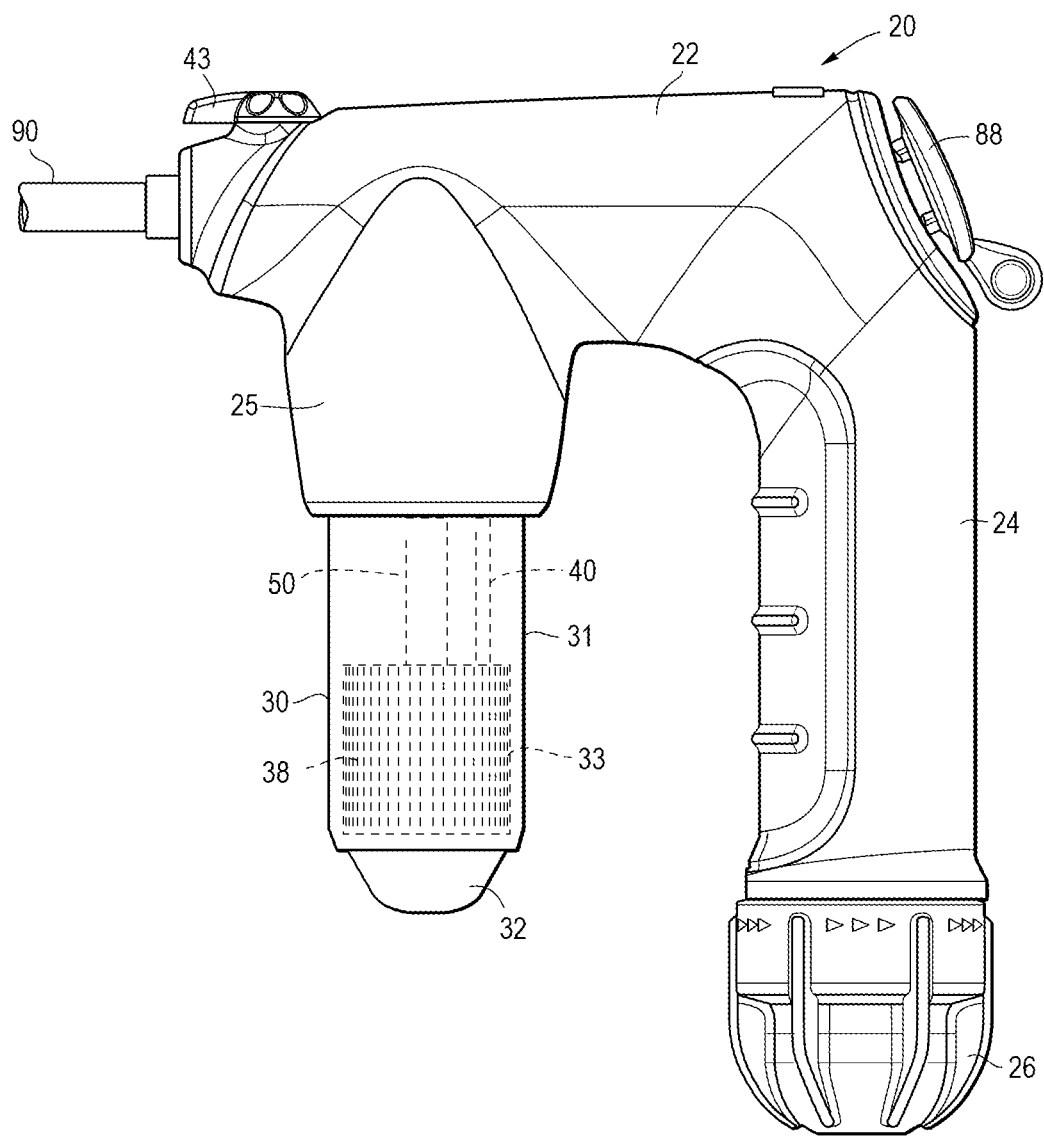
FIG. 1 is a perspective view of a system for delivering therapeutic agents in accordance with an embodiment, showing a housing, a front valve (second valve) and a button.
Figure 4:
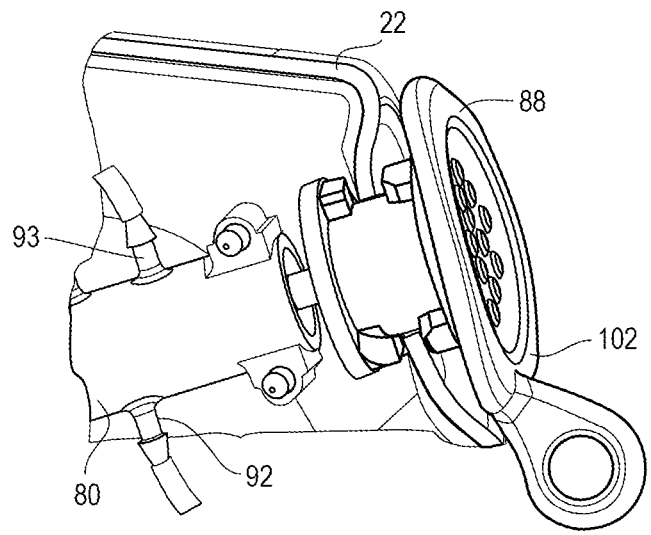
FIG. 4 is an enlarged perspective view of a portion of the system of FIG. 1, showing the button in the default state.
Figure 5:
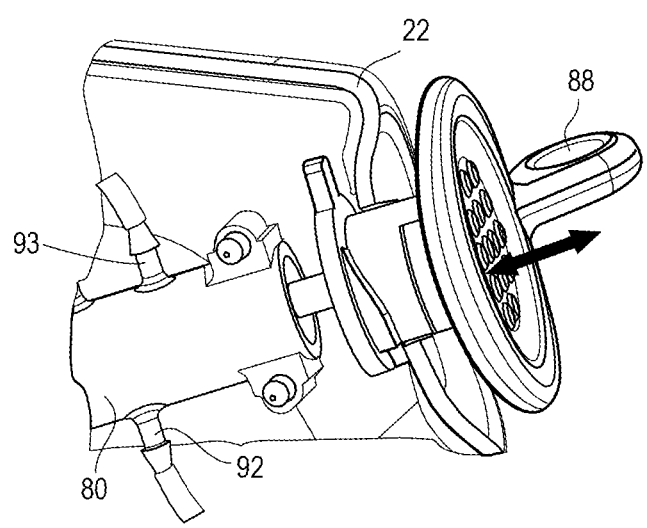
FIG. 5 is another enlarged perspective view of a portion of the system of FIG. 1, showing the button in an activated state (movable between a second position and a third position).

In the present application, the term "proximal" refers to a direction that is generally towards a physician during a medical procedure, while the term "distal" refers to a direction that is generally towards a target site within a patient's anatomy during a medical procedure. The term "configured to" is used to describe structural limitations in a particular manner that requires specific construction to accomplish a stated function and/or to interface or interact with another component(s), and is not used to describe mere intended or theoretical uses. Relative terminology and broader terms such as "generally," "about," "substantially," and the like will be understood by those of skill in the art as providing clear and definite scope of disclosure and/or claiming. For example, the term "substantially 90 degrees" will be understood as not requiring exactly 90.00 degrees, but rather including that and functional equivalents within normal manufacturing tolerances and ranges understood by those of skill in the art to be functional and acceptable. The term "about" is specifically defined herein to include the specific value referenced as well as a dimension that is within 5% of the dimension both above and below the dimension.

Referring now to FIGS. 1-26, an embodiment of a system 20 suitable for delivering one or more therapeutic agents to a target site is shown. In this embodiment, the system 20 comprises a container 30 that is configured to hold a therapeutic agent 38, at least one pressure source 68 having pressurized fluid, which is configured to be placed in selective fluid communication with at least a portion of the container 30, and a catheter 90 that is configured to be placed in selective fluid communication with the container 30 and to deliver the therapeutic agent 38 or the pressurized fluid (e.g., without the therapeutic agent) through the catheter 90 to a target site within the patient, as explained more fully below.

The system 20 further comprises a housing 22, which is suitable for securely retaining, holding, engaging and/or covering the container 30, pressure source 68, catheter 90, and other components described below. Preferably, the housing 22 comprises an upright section 24 that may be grasped by a user and a section 25 that acts as a housing for the container 30. An actuator 26 may be engaged by a user prior to delivering the pressurized fluid without the therapeutic agent or delivering the therapeutic agent.

Figure 6:
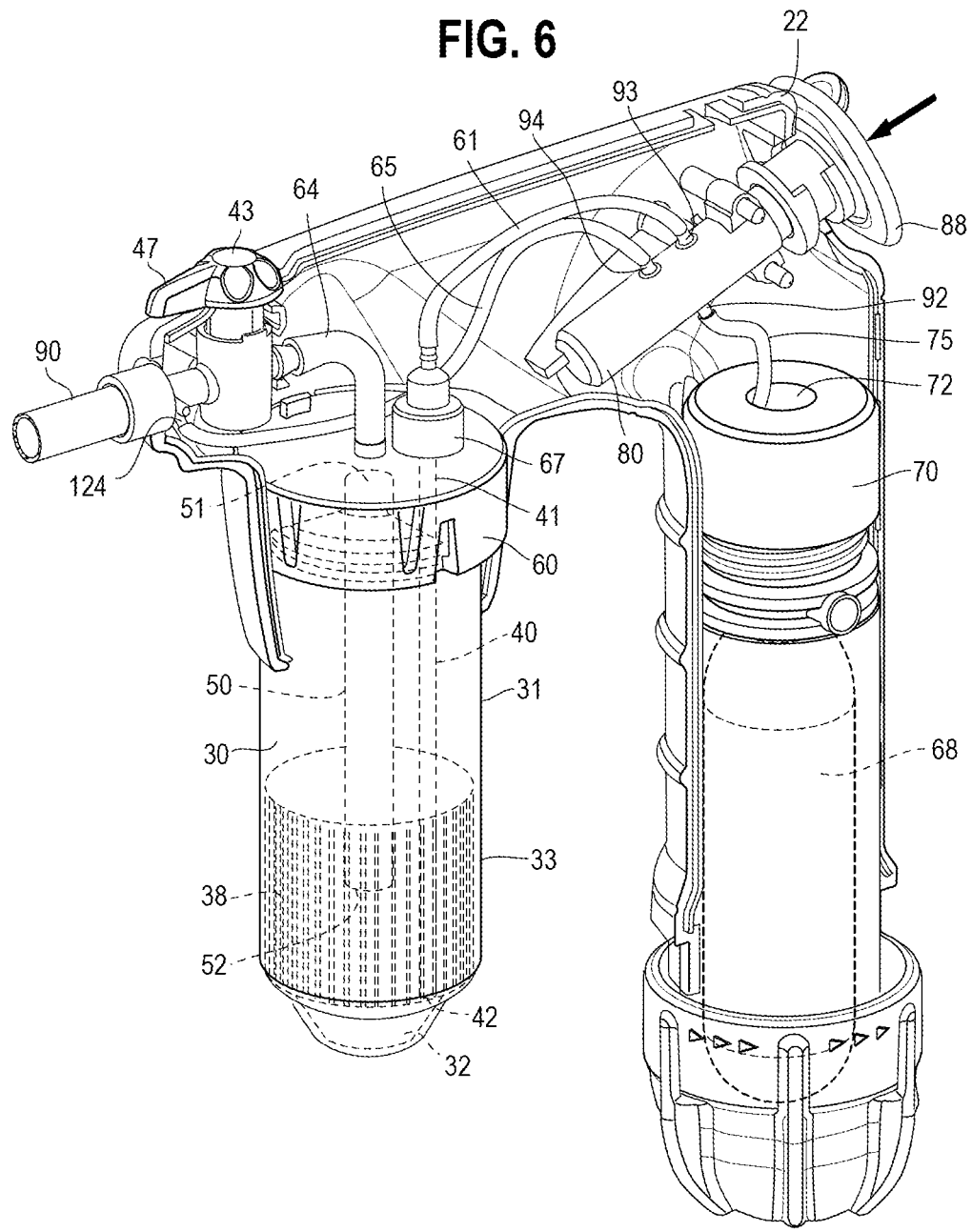
FIG. 6 is another perspective view of the system of FIG. 1, with a portion of the housing removed, showing the front valve in the second state, a back valve (first valve) coupled to the button, and the button depressed.

The system 20 further comprises a first valve 80 (e.g., back valve, as shown in FIG. 6) configured to be connected between the pressure source 68 and the container 30, a second valve 43 (e.g., front valve, as shown in FIG. 1) configured to be connected between the container 30 and the catheter 90, and a button 88 configured to selectively activate the first valve 80 to deliver the pressurized fluid without the therapeutic agent 38 or to deliver the therapeutic agent 38, as described in greater detail below. The housing 22 is configured to rotationally support the button 88, as discussed in greater detail below.

Figure 7:
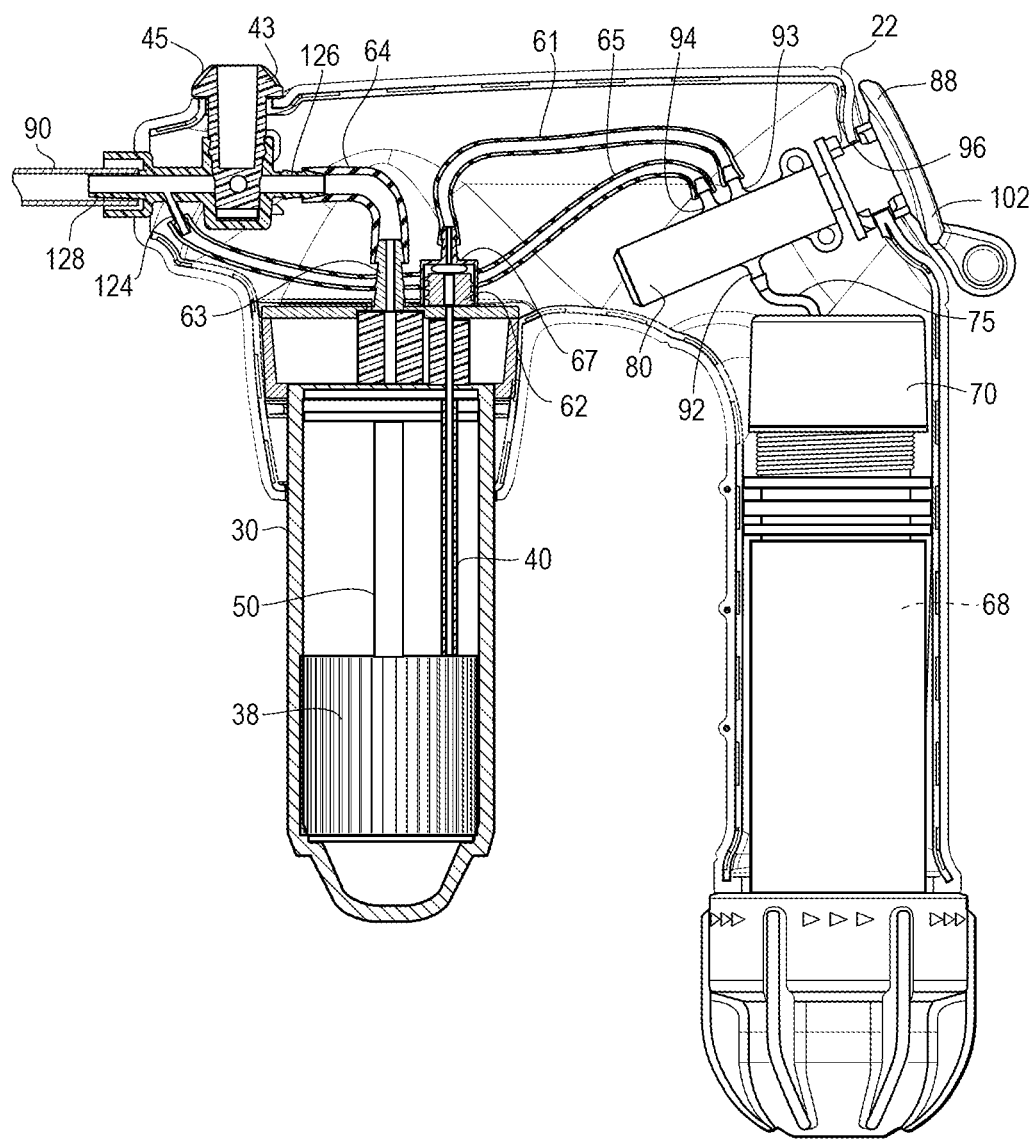
FIG. 7 is a schematic side view of the system of FIG. 1, showing the front valve in the first state and the button in the default state (first position).
Figure 8:
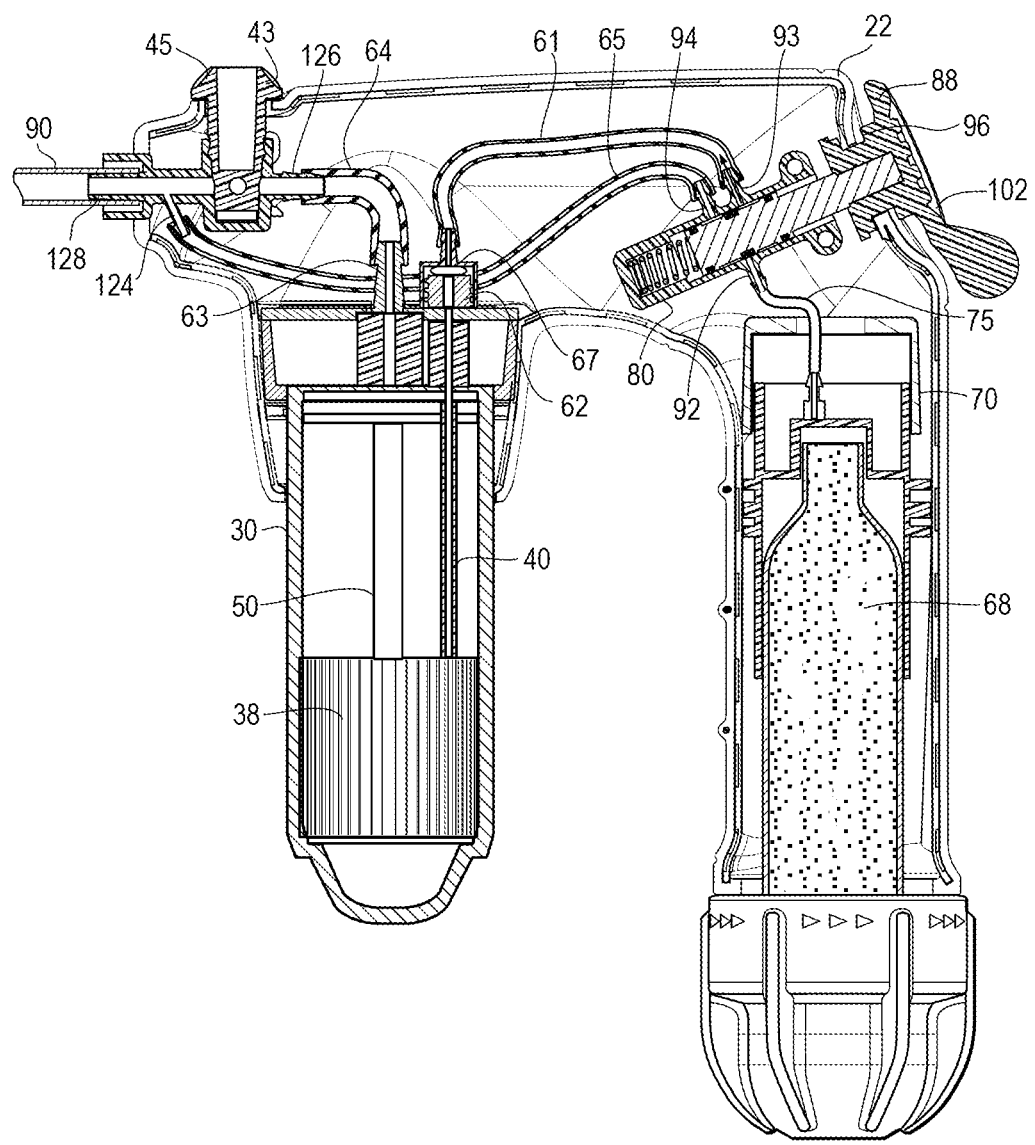
FIG. 8 is a cross-sectional view of the system of FIG. 1, showing the front valve in the first state and the button in the default state (first position).
Figure 9:
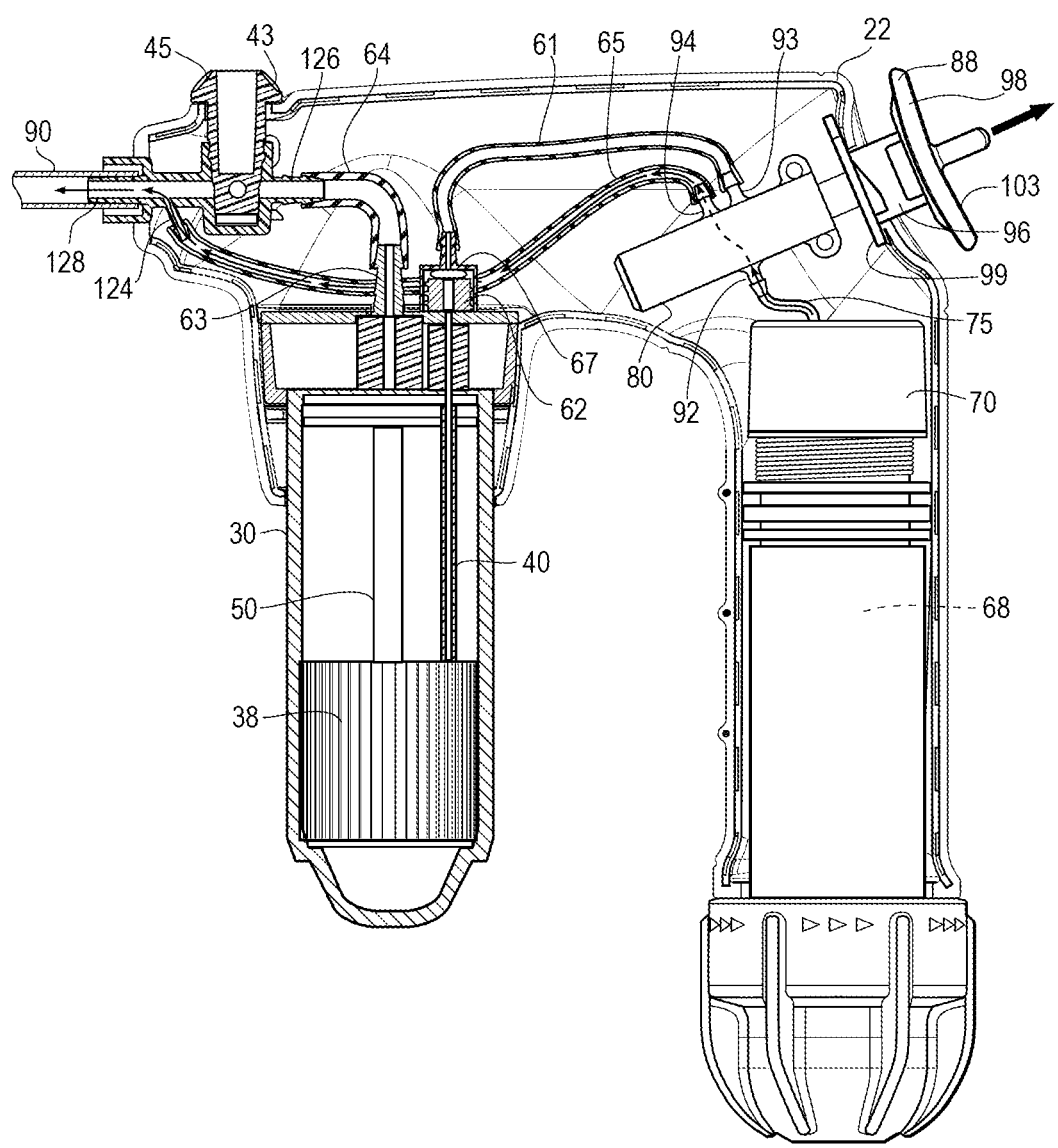
FIG. 9 is a schematic side view of the system of FIG. 1, showing the front valve in the first state and the button in the second position.
Figure 10:
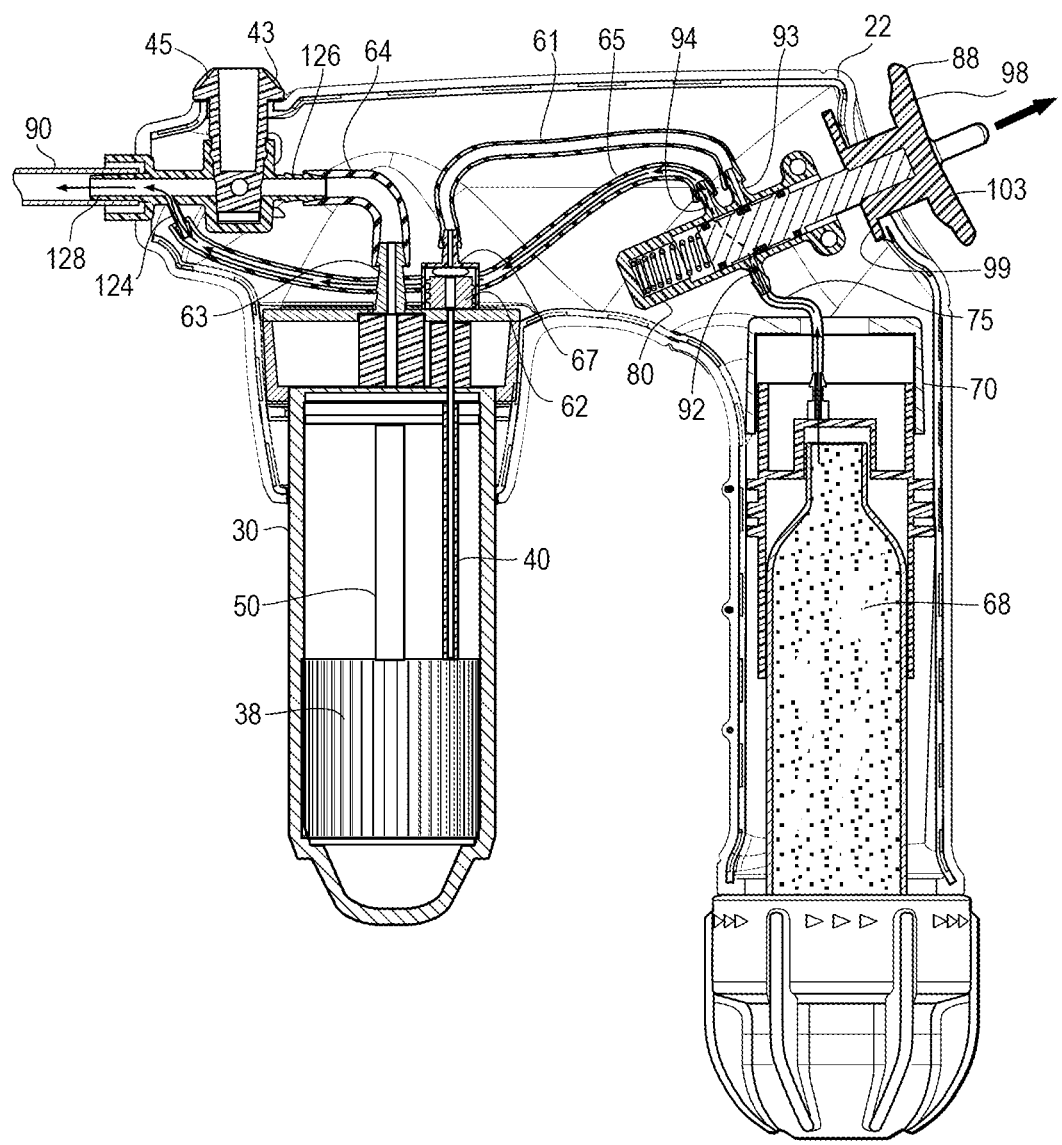
FIG. 10 is a cross-sectional view of the system of FIG. 1, showing the front valve in the first state and the button in the second position.
Figure 11:
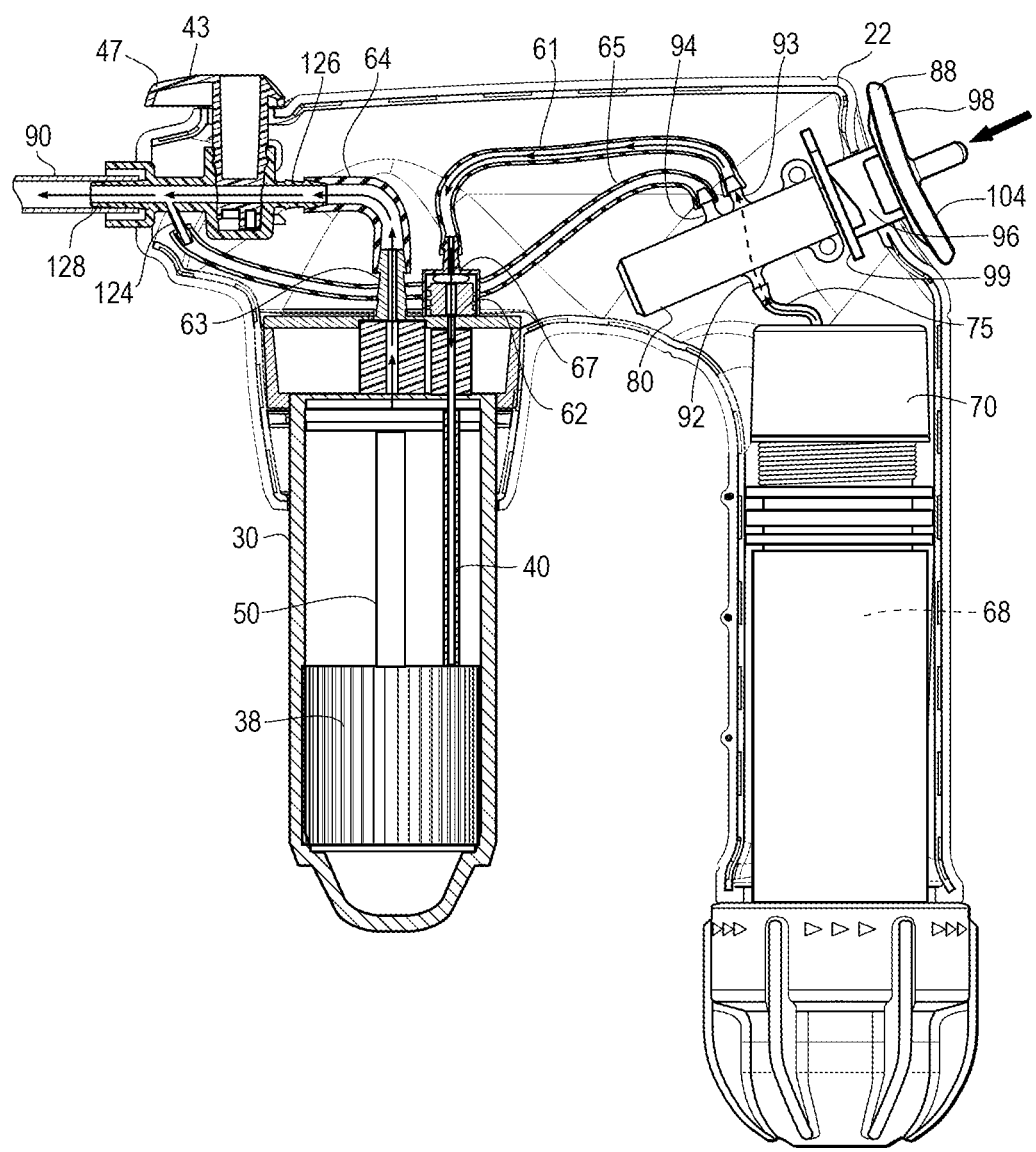
FIG. 11 is a schematic side view of the system of FIG. 1, showing the front valve in the second state and the button in the third position.
Figure 12:
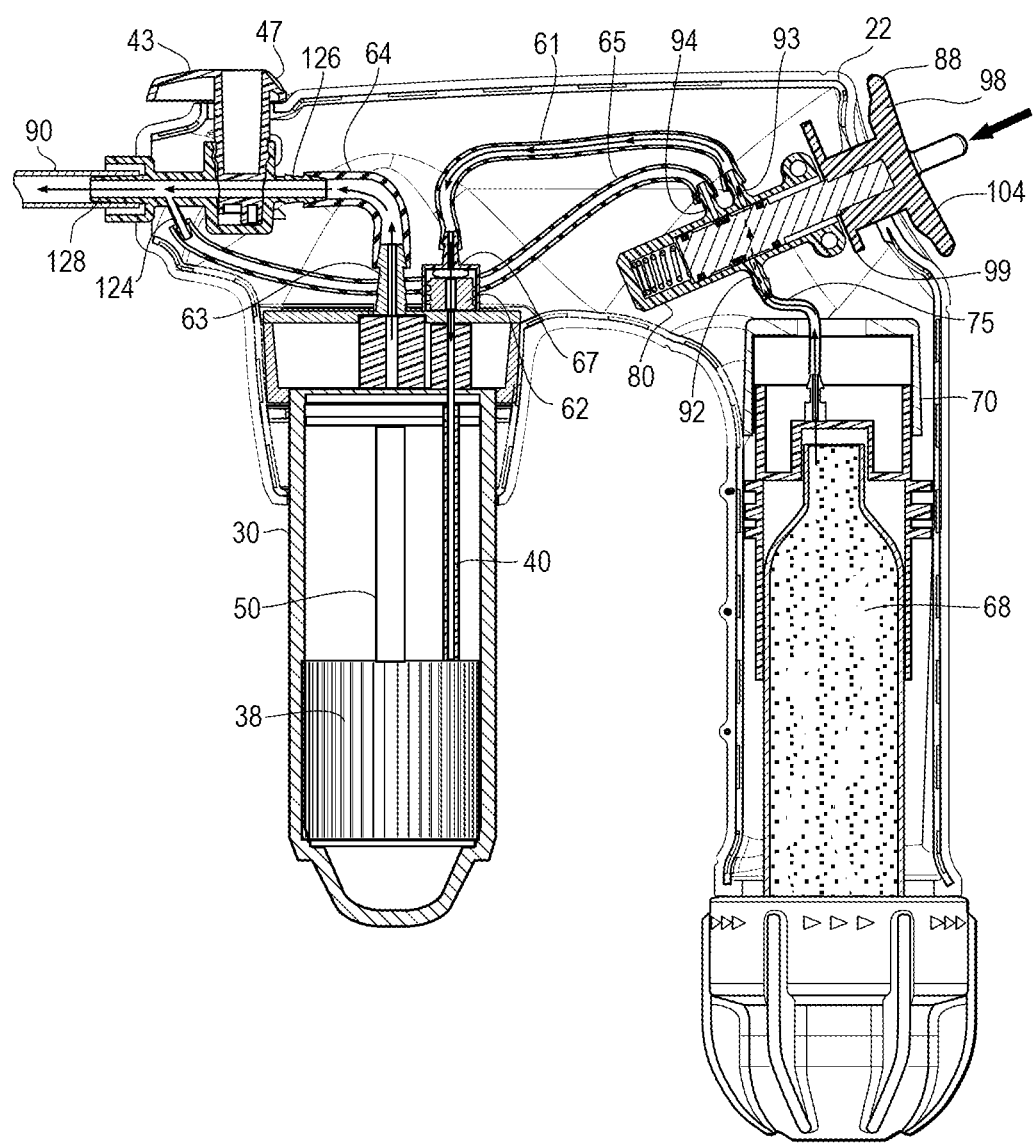
FIG. 12 is a cross-sectional view of the system of FIG. 1, showing the front valve in the second state and the button in the third position.

Referring to FIGS. 7-12, the button 88 is movable among a first position 102 (e.g., as shown in FIGS. 7 and 8), a second position 103 (e.g., as shown in FIGS. 9 and 10), and a third position 104 (e.g., as shown in FIGS. 11 and 12). As discussed in greater detail below, when the button 88 is in the first position 102, the first valve 80 is configured to prevent delivery of the therapeutic agent 38 through the catheter 90 and prevent delivery of the pressurized fluid through the catheter 90. When the button 88 is in the second position 103, the first valve 80 is configured to allow the pressurized fluid in the pressure source 68 to flow through the first valve 80 and into the catheter 90 absent delivery of the therapeutic agent 38. When the button 88 is in the third position 104, the first valve 80 is configured to allow delivery of the therapeutic agent 38 through the catheter 90.

The container 30 may comprise any suitable size and shape for holding the therapeutic agent 38. As shown in FIGS. 1 and 6, the container 30 comprises a generally tube-shaped configuration having a first region 31, a second region 32, and a reservoir 33 defined by an interior of the container 30. Referring to FIG. 6, the container 30 may further comprise an inlet tube 40, an outlet tube 50, and a first cap 60, where the first cap 60 is configured to be secured to the first region 31 of the container 30. The inlet tube 40 has first and second ends 41 and 42 with a lumen extending therebetween, while the outlet tube 50 has first and second ends 51 and 52 with a lumen extending therebetween. The first end 41 of the inlet tube 40 is placed in fluid communication with an inlet port 62 (e.g., as shown in FIG. 7) formed in the first cap 60, while the first end 51 of the outlet tube 50 is placed in fluid communication with an outlet port 63 (e.g., as shown in FIG. 7) formed in the first cap 60.

A second cap 67 may be secured on the inlet port 62, which will allow the connection between the inlet port 62 and the tubing 61 (e.g., see FIGS. 6 and 7). In some embodiments, an O-RING may be placed around the inlet port 62 or around the second end 41 of the inlet tube 40 (e.g., when the second end 41 extends out from the inlet port 62), which ensures that the second cap 67 is well sealed when the second cap 67 is secured on the inlet port 62, such that no fluid escapes but goes right into the container 30 during operation. The outlet port 63 in the first cap 60 may be placed in fluid communication with tubing 64, which extends in a distal direction and connects to the catheter 90 with the second valve 43 disposed therebetween. By manipulating the second valve 43, a user has the option to selectively deliver the therapeutic agent 38 flowing from the tubing 64 via the catheter 90. For example, the second valve 43 may be configured to have a first state 45 (e.g., a closed state, as shown in FIG. 2) and a second state 47 (e.g., an open state, as shown in FIG. 3). When the second valve 43 is in the first state 45 (e.g., as shown in FIGS. 7, 8, 9, and 10), the catheter 90 is not in fluid communication with the tubing 64 and the container 30. When the second valve 43 is in the second state 47 (e.g., as shown in FIGS. 6, 11, and 12), the catheter 90 is in fluid communication with the tubing 64 and the container 30.

During operation, fluid passed through the inlet port 62 of the first cap 60 is directed through the inlet tube 40 and into the reservoir 33. Notably, the u-shaped curvature near the second region 32 of the container 30 effectively changes the direction of the fluid flow by approximately 180 degrees, such that the fluid originally flows in a direction from the first region 31 of the container 30 towards the second region 32, and then from the second region 32 back towards the first region 31. As shown in FIGS. 1 and 6, the first region 31 of the container 30 is disposed vertically above the second region 32 of the container 30 during use, however, it is possible to have different placements of the first and second regions 31 and 32 relative to one another, such that they are disposed at least partially horizontally adjacent to one another.

The second end 52 of the outlet tube 50 may terminate a predetermined distance above the second region 32 of the container 30, as shown in FIG. 6. Accordingly, when fluid from the pressure source 68 is redirected from the second region 32 towards the first region 31, the fluid and the therapeutic agent 38 within the reservoir 33 may be directed through the outlet tube 50, through the outlet port 63, and towards a target site. Alternatively, the outlet tube 50 may be omitted and the therapeutic agent 38 may flow directly from the reservoir 33 into the outlet port 63. Other variations on the container 30 and the outlet port 63 may be found in U.S. Pat. No. 8,118,777, which is hereby incorporated by reference in its entirety.

The first cap 60 may comprise any suitable configuration for sealingly engaging the first region 31 of the container 30. In one example, an O-ring is held in place around a circumference of the first cap 60 to hold the therapeutic agent 38 within the reservoir 33. The inlet and outlet tubes 40 and 50 may be held in place within the container 30 by one or more support members, such as those explained further in U.S. Pat. No. 8,118,777.

Further, the first cap 60 may comprise one or more flanges that permit a secure, removable engagement with a complementary internal region of the section of the housing 22. For example, by rotating the container 30, the flange of the first cap 60 may lock in place within the section 25.

Advantageously, in this manner, a first container holding a first therapeutic agent may be coupled to the housing 22 for use with the system 20, and subsequently a second container holding a second composition or agent may be coupled to the housing 22 for use with the system 20. By way of example, and without limitation, in one embodiment the system 20 may be "preloaded" with a first container 30 holding a therapeutic agent in the form of a hemostatic power. At a later time, it may be deemed beneficial to deliver a mucoadhesive composition, in which case the first container 30 may be rotated to disengage its flange from the section 25 of the housing 22, and then insert a second container 30 into the section of the housing 22 for delivery of the mucoadhesive composition. For the sake of brevity, the formulation in the container 30 will be referred to as a "therapeutic agent 38," although as explained herein certain formulations in a container 30 coupled to the housing 22 may be interchanged or varied and may or may not achieve a therapeutic effect per se.

The pressure source 68 may comprise one or more components capable of producing or furnishing a fluid having a desired pressure. In one embodiment, the pressure source 68 may comprise a pressurized fluid, such as a liquid or gas. For example, as shown in FIG. 6, the pressure source 68 may comprise a pressurized fluid cartridge of a selected gas or liquid, such as carbon dioxide, nitrogen, or any other suitable gas or liquid that may be compatible with the human body. The pressurized fluid cartridge may contain the gas or liquid at a relatively high, first predetermined pressure, for example, around 1,800 psi inside of the cartridge. The pressure source 68 optionally may comprise one or more commercially available components.

The fluid may flow from the pressure source 68 through a pressure regulator, such as a regulator valve 70 having a pressure outlet 72, which may reduce the pressure to a lower, second predetermined pressure. In some embodiments, a spacer may be disposed between the regulator valve 70 and the pressure source 68, which facilitates securing the pressure source 68 in place during transportation.

The actuator 26 may be actuated to release the fluid from the pressure source 68. For example, a user may rotate the actuator 26, which translates into linear motion via a threaded engagement between the actuator 26 and the housing 22. When the linear advancement is imparted to the pressure source 68, the regulator valve 70 may pierce through a seal of the pressure cartridge (and the spacer) to release the high pressure fluid. After the regulator valve 70 reduces the pressure, the fluid may flow from the pressure outlet 72 towards the first valve 80 via tubing 75.

Figure 19:
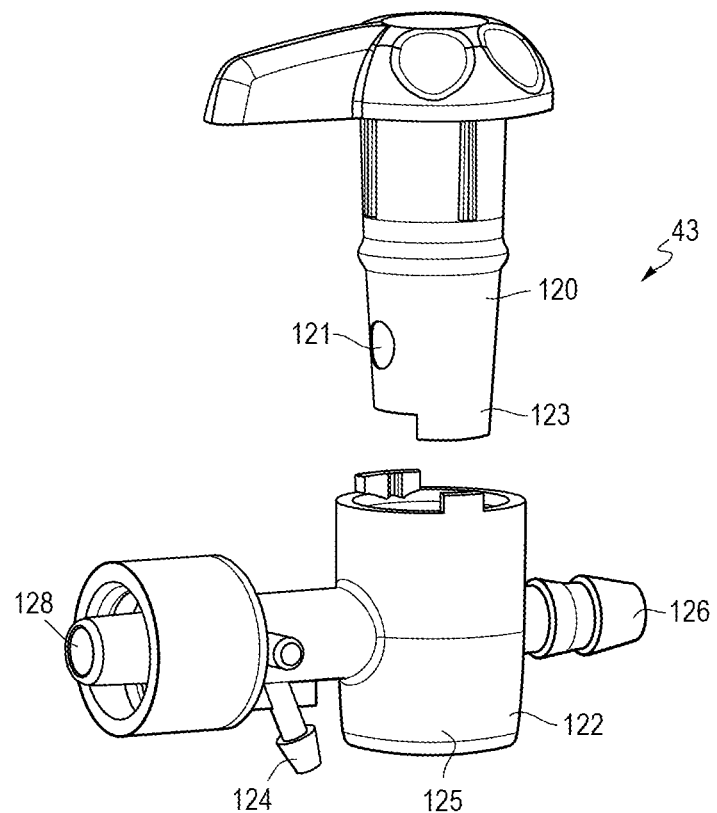
FIG. 19 is an enlarged perspective view of the front valve of FIG. 1, showing an upper portion of the front valve and a lower portion of the front valve.
Figure 20:
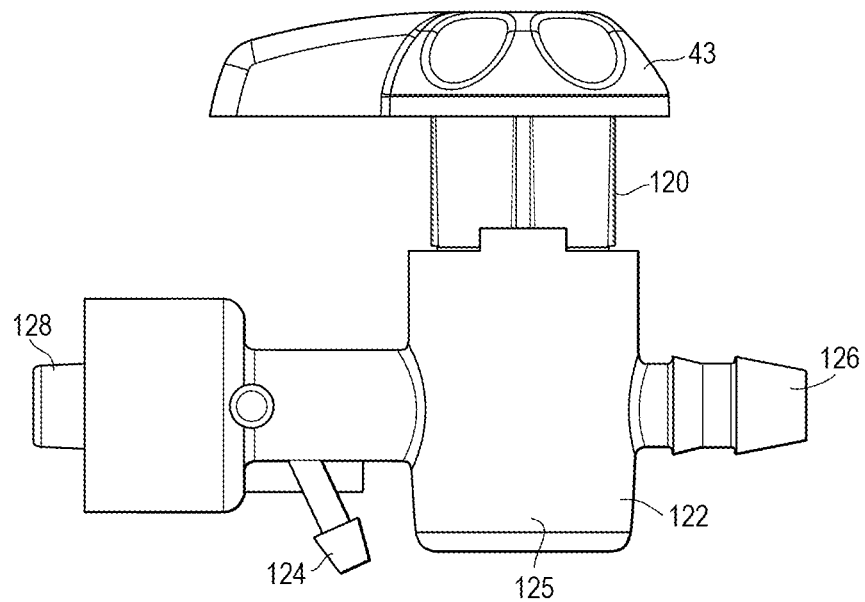
FIG. 20 is an enlarged perspective view of the front valve of FIG. 19, showing the upper portion and the lower portion of the front valve coupled together.

Referring to FIGS. 6, 19, and 20, the second valve 43 may be a stopcock including an upper portion 120 and a lower portion 122. The lower portion 122 includes a first inlet port 124, a second inlet port 126, an outlet port 128, and a middle section 125, where the first inlet port 124 and the outlet port 128 are disposed distal to the middle section 125, and the second inlet port 126 is disposed proximal to the middle section 125. A lower section 123 of the upper portion 120 includes a through hole 121 and is configured to be received in the middle section 125. The second inlet port 126 is configured to be connected to the tubing 64 and the outlet port 128 is configured to be connected to the catheter 90.

The second valve 43 can be transitioned between the first state 45 (e.g., a closed state, as shown in FIG. 2) and the second state 47 (e.g., an open state, as shown in FIG. 3) via rotation of the upper portion 120 of the second valve 43. For example, as shown in FIGS. 2 and 3, rotating the upper portion 120 of the second valve 43 in a first direction 110 (e.g., clockwise) may transition the second valve 43 from the first state 45 (e.g., the closed state) to the second state 47 (e.g., the open state), and rotating the second valve 43 in an opposite second direction 111 (e.g., counterclockwise) may transition the second valve 43 from the second state 47 (e.g., the open state) back to the first state 45 (e.g., the closed state). When the second valve 43 is in the first state 45, a passageway between the second inlet port 126 and the outlet port 128 is blocked by the lower section 123 of the upper portion 120, such that the catheter 90 is not in fluid communication with the container 30. When the second valve 43 is in the second state 47, a passageway is established between the second inlet port 126 and the outlet port 128 via the through hole 121, such that the catheter 90 is in fluid communication with the container 30.

Referring to FIGS. 6 and 13-18, the first valve 80 comprises a main body 81 having a proximal end 81*a*, a distal end 81*b*, and an inner lumen 81*c* extending between the proximal end 81*a* and the distal end 81*b*. A spring 95 (e.g., compression spring) may be disposed in the inner lumen 81*c* of the main body 81. A piston 82, which extends between a distal end portion 82*b* and a proximal end portion 82*a*, is disposed at least partially within the main body 81 and is slidably movable along a length of the inner lumen 81*c* of the main body 81. A button 88 is configured to be coupled to the proximal end portion 82*a* of the piston 82 such that depression of the button 88 causes the piston 82 to move distally along a length of the inner lumen 81*c* of the main body 81. The proximal end portion 82*a* of the piston 82 may extend a distance outside of the main body 81 (e.g., as shown in FIGS. 13-15), to facilitate coupling to the button 88. The distal end portion 82*b* of the piston 82 may be positioned adjacent to (e.g., connected to) a proximal end 95*a* of the spring 95 (e.g., as shown in FIGS. 13-15).

Figure 16:
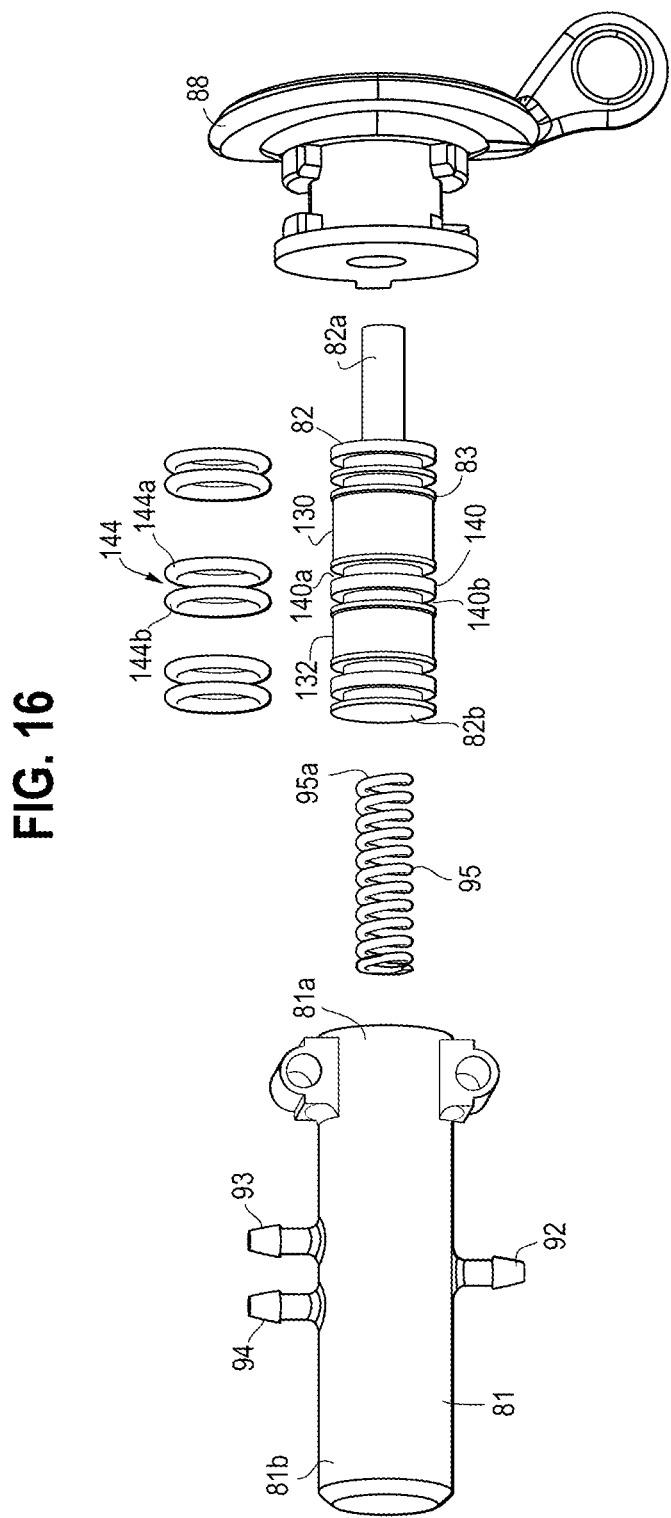
FIG. 16 is an enlarged exploded view of a portion of the system of FIG. 1, showing the back valve and the button, where the back valve includes a main body, a piston, and a spring.
Figure 17:
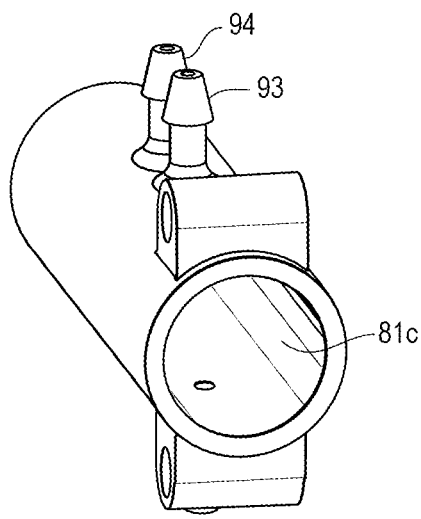
FIG. 17 is a perspective view of the main body of the back valve of FIG. 16.
Figure 18:
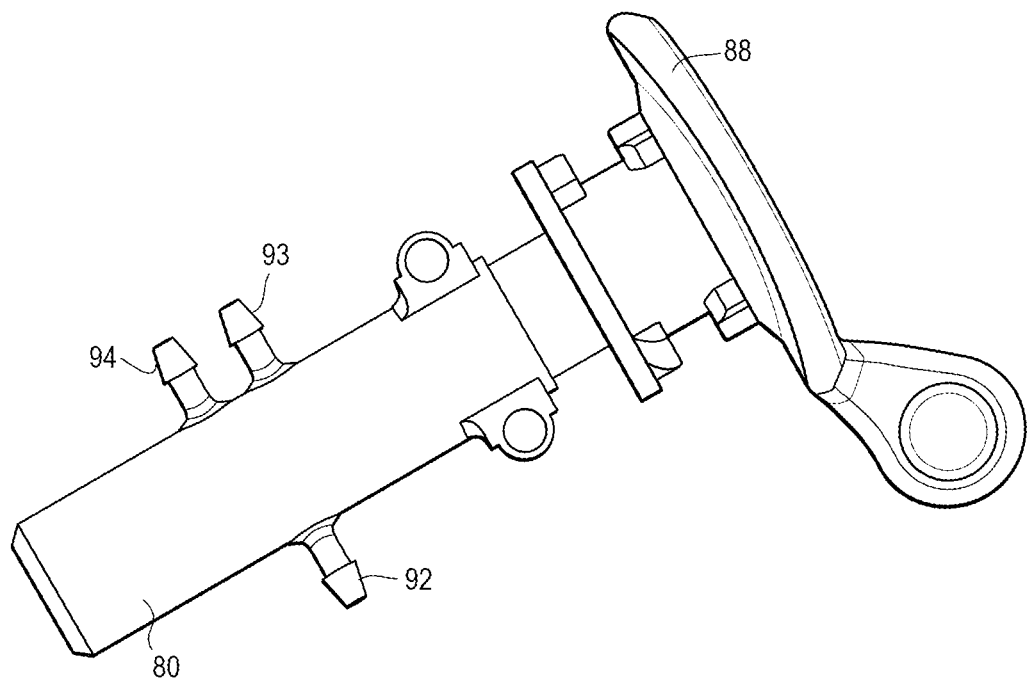
FIG. 18 is a perspective assembled view of the portion of the system shown in FIG. 16, showing the back valve and the button coupled together.

Various inlet and outlet ports may be associated with the first valve 80. In the embodiment shown in FIGS. 1-18, the main body 81 includes an inlet port 92, a first outlet port 93, and a second outlet port 94. The inlet port 92 of the first valve 80 may be coupled to the tubing 75 extending from the pressure outlet 72 of the regulator valve 70 (e.g., as shown in FIG. 6), thus providing pressurized fluid at a predetermined pressure into the first valve 80. The first outlet port 93 may be coupled to the tubing 61 extending from the inlet port 62 of the first cap 60. The second outlet port 94 may be coupled to the tubing 65 extending from the first inlet port 124 of the second valve 43 (e.g., as shown in FIG. 6). As shown in FIG. 16, the first outlet port 93 may be disposed proximal to the second outlet port 94.

As shown in FIGS. 13-16, the piston 82 of the first valve 80 may include a generally tubular body 83 having spaced apart first groove 130 and second groove 132 disposed on an outer surface of the piston 82. The first groove 130 and the second groove 132 each may extend around a circumference of a cross section of the tubular body 83 with a constant depth, and the first groove 130 may be disposed proximal to the second groove 132. The tubular body 83 of the piston 82 may further include a valley 140 disposed between the first and second grooves 130 and 132 on the outer surface of the piston 82. The valley 140 may be configured for receiving a sealing member 144 configured for selectively closing the inlet port 92, the first outlet port 93, or the second outlet port 94, as discussed in greater detail below.

The valley 140 may extend around a circumference of a cross section of the tubular body 83 with a constant depth. In some embodiments, the valley 140 may include a first sub-valley 140*a* and a second sub-valley 140*b* spaced apart by a portion of the outer surface of the tubular body 83. The sealing member 144 may include at least one O-Ring configured to be received in the valley 140. As shown in FIG. 16, the sealing member 144 includes a first O-Ring 144*a* configured to be disposed in the first sub-valley 140*a* and a second O-Ring 144*b* configured to be disposed in the second sub-valley 140*b*.

Referring to FIGS. 13-15, in use, the piston 82 is disposed at least partially within the main body 81 and is slidably movable along a length of the inner lumen 81*c* of the main body 81. The inlet port 92, the first outlet port 93, and the second outlet port 94 of the main body 81 of the first valve 80, the first and second grooves 130 and 132, the valley 140, and the sealing member 144 (e.g., including the first and second O-Rings 144*a* and 144*b*) are configured and spaced such that when the button 88 is in the first position 102 (e.g., as shown in FIGS. 7, 8, and 13), the sealing member 144 disposed in the valley 140 is axially aligned with the inlet port 92, such that no fluid communication is established between the inlet port 92 and any of the first and second outlet ports 93 and 94, and the pressurized fluid from the pressure source 68 (as regulated by the regulator valve 70) does not flow into the first valve 80, as discussed in greater detail below.

When the button 88 is in the second position 103 (e.g., as shown in FIGS. 9, 10, and 14), the sealing member 144 is axially offset from the inlet port 92 and the second outlet port 94, but the sealing member 144 is axially aligned with the first outlet port 93, such that fluid communication is established between the inlet port 92 and the second outlet port 94 via the second groove 132, and the pressurized fluid may flow into the first valve 80 via the inlet port 92, into the second groove 132, and exit the first valve 80 via the second outlet port 94, as discussed in greater detail below. When the button 88 is in the third position 104 (e.g., as shown in FIGS. 11, 12, and 15), the sealing member 144 is axially offset from the inlet port 92 and the first outlet port 93, but the sealing member 144 is axially aligned with the second outlet port 94, such that fluid communication is established between the inlet port 92 and the first outlet port 93 via the first groove 130, and the pressurized fluid may flow into the first valve 80 via the inlet port 92, into the first groove 130, and exit the first valve 80 via the first outlet port 93, as discussed in greater detail below.

It will be appreciated that the number, configuration, and position of the grooves, valleys, sub-valleys, and sealing members included in the piston 82 and the inlet and outlet ports associated with the first valve 80 may be varied, as desired and/or needed, without departing from the scope of the present invention, as long as fluid communication routes can be selectively aligned to permit flow between the inlet port and the outlet port connected to the tubing 65 coupled to the first inlet port 124 of the second valve 43 in one state of the first valve 80, and to permit flow between the inlet port and the outlet port connected to the tubing 61 coupled to the inlet port 62 of the first cap 60 in another state of the first valve 80, such that the pressurized fluid (without the therapeutic agent 38) or the therapeutic agent 38 can be selectively delivered using the first valve 80 and the button coupled to the first valve 80.

Referring to FIGS. 1-12, as discussed above, the button 88 is configured to move among the first position 102 (e.g., default state), the second position 103 (e.g., activated state), and the third position 104 (e.g., activated state). When the button 88 is in the default state, delivery of the therapeutic agent 38 (e.g., spray powder) and delivery of the pressurized fluid both are not allowed by pressing the button 88, and when the button 88 is in the activated state, the button 88 is configured to selectively allow delivery of the pressurized fluid without the therapeutic agent 38 or delivery of the therapeutic agent 38. This configuration is advantageous as it allows the system to operate in three different modes: 1) neutral, 2) pressurized fluid (e.g., gas) always on, and 3) therapeutic agent (e.g., spray powder) available on demand. Benefit of this system includes that it can be fully "off" to the pressurized fluid and the therapeutic agent 38 (e.g., when the system is in the neutral mode, the button 88 cannot be pressed to deliver the pressurized fluid or the therapeutic agent 38). If the pressurized fluid or the therapeutic agent 38 are no longer required, the system 20 can be moved back to the neutral mode, where no pressurized fluid or therapeutic agent flow is available.

When the button 88 is in the first position 102, at least a portion of the housing 22 limits the button 88 to a rotational movement (e.g., rotating around an axis extending along the length of the piston 82). In some embodiments, as shown in FIGS. 7 and 8, the button 88 includes a groove 96, and when the button is in the first position 102, at least a portion of the housing 22 is received within the groove 96 of the button 88, which limits the button to a rotational movement. In other words, at least a portion of the housing 22 blocks the button 88 such that the button 88 cannot be pressed to move linearly an appreciable distance along the direction of the length of the main body 81 of the first valve 80.

The button 88 is configured to be rotated between the default state and the activated state. For example, the button 88 is configured to be rotated substantially 90 degrees from the default state (e.g., first position 102) to the activated state (e.g., the second position 103). Referring to FIGS. 7-10, when the button 88 is rotated substantially 90 degrees (e.g., counterclockwise, in the perspective of FIG. 2) from the first position 102, it allows the portion of the housing 22 received within the groove 96 of the button 88, to move out of the groove 96, such that the housing 22 no longer blocks the button 88. After the portion of the housing 22 moves out of the groove 96 of the button 88, the button 88 is no longer limited to the rotational movement, and the housing 22 allows a linear movement (e.g., along a direction of the length of the main body 81 of the first valve 80) of the button 88, which allows the spring 95 of the first valve 80 to move the button 88 proximally from the first position 102 (e.g., as shown in FIGS. 7 and 8) to the second position 103 (e.g., as shown in FIGS. 9 and 10), where a distal end portion 99 of the button 88 (e.g., extending between a proximal end portion 98 and a distal end portion 99, as shown in FIGS. 13-15) may contact at least a portion of the housing 22 such that the button 88 cannot further move proximally. When the button 88 is in the second position 103, the button 88 is biased to the second position 103 without external force. In other words, when the button 88 is in the activated state, delivery of the pressurized fluid without the therapeutic agent 38 is allowed without the button 88 being pressed.

As discussed above, when the button 88 is in the activated state and not being pressed (e.g., the second position 103; as shown in FIGS. 9, 10, and 14), the first valve 80 is configured to allow the pressurized fluid in the pressure source 68 to flow through the first valve 80 and into the catheter 90 absent delivery of the therapeutic agent 38. Specifically, when the button 88 is in the second position 103, the sealing member 144 of the first valve 80 is axially offset from the inlet port 92 and the second outlet port 94, but the sealing member 144 is axially aligned with the first outlet port 93, such that the pressurized fluid may flow into the first valve 80 via the inlet port 92, into the second groove 132, and exit the first valve 80 via the second outlet port 94. In this manner, pressurized fluid from the pressure source 68 (as regulated by the regulator valve 70) is directed into the second outlet port 94 and into the tubing 65, where it is then directed into the catheter 90 via the first inlet port 124 of the second valve 43. Having the tubing 65 coupled to the first inlet port 124 is advantageous as it allows for delivery of the pressurized fluid through the catheter 90 no matter whether the second valve 43 is in the first state 45 or the second state 47.

When the button 88 is in the second position 103, the spring 95 of the first valve 80 allows the button 88 to be depressed to move distally from the second position 103 (e.g., as shown in FIGS. 9 and 10) to the third position 104 (e.g., when the button 88 is in the activated state, fully depressed, and blocked by the proximal end 81a of the main body 81 of the first valve 80; as shown in FIGS. 11, 12, and 15). By pressing and holding, the button 88 will stay at the third position 104, and by releasing the button 88, the button 88 returns to the second position 103. When the button 88 is in the third position 104 (e.g., as shown in FIGS. 11, 12, and 15), the first valve 80 is configured to allow the pressurized fluid in the pressure source 68 to flow through the first valve 80, into the container 30, and urge the therapeutic agent 38 in the container 30 through the catheter 90.

Specifically, when the button 88 is in the third position 104, the sealing member 144 of the first valve 80 is axially offset from the inlet port 92 and the first outlet port 93, but the sealing member 144 is axially aligned with the second outlet port 94, such that the pressurized fluid may flow into the first valve 80 via the inlet port 92, into the first groove 130, and exit the first valve 80 via the first outlet port 93. In this manner, the pressurized fluid from the pressure source 68 (as regulated by the regulator valve 70) is directed into the first outlet port 93 and into the tubing 61, where it is then directed into the inlet port 62 of the first cap 60 and into the container holding the therapeutic agent 38, and where it is then directed into the outlet tube 50, into the outlet port 63 of the first cap 60, and into the tubing 64, at which point, delivery of the therapeutic agent 38 can be controlled by the second valve 43, as discussed above. When the second valve 43 is in the second state 47 (e.g., as shown in FIGS. 11 and 12), a passageway is established between the second inlet port 126 and the outlet port 128, such that the therapeutic agent 38 flowing from the tubing 64 can be delivered through the catheter 90 coupled to the outlet port 128.

Accordingly, the button 88 can be rotated to move from the default state to the activated state. When the button 88 is in the activated state, delivery of the therapeutic agent 38 is allowed when the button 88 is pressed, and when the button 88 is released, delivery of the therapeutic agent 38 is prevented, while delivery of the pressurized fluid without the therapeutic agent 38 is still allowed. This configuration is advantageous for creating a pressurized fluid always on mode once the button is moved to the activated state. Once the button 88 is rotated to the activated state, the first valve 80 is activated, which allows the pressurized fluid to start flowing out from the catheter 90 in the background. To deliver the therapeutic agent 38, the button 88 is pressed and moved to the third position 104. Once the button 88 is not pressed anymore, the pressured fluid starts to flow again. To turn off the pressured fluid, the button 88 needs to be returned to the default state. The button 88 is configured to be rotated from the second position 103 back to the first position 102, as discussed in greater detail below.

This configuration improves the ability of the system 20 to spray therapeutic agent 38 (e.g., spray powder) in moisture saturated medium (e.g., the abdominal cavity or other bodily passages). The system 20 allows to deliver the pressurized fluid prior to spraying the therapeutic agent 38, which will prevent water ingress due to the catheter being fed through a channel of a scope (such as an endoscope), between powder sprays, as well as user irrigating the scope, moving the scope to a different site position, or accidentally dipping the catheter into a pool of fluid, etc. This may remove the risk of device clogging and lead to reduced number of catheters packaged per device, and thus reducing environmental burden. Also, reduced clogging improves overall procedure time and customer experience with the system during its use. In addition, the ability to deliver just the pressurized fluid prior to deployment of the therapeutic agent 38 will allow the user to clean the inner lumen of the catheter.

Figure 21:
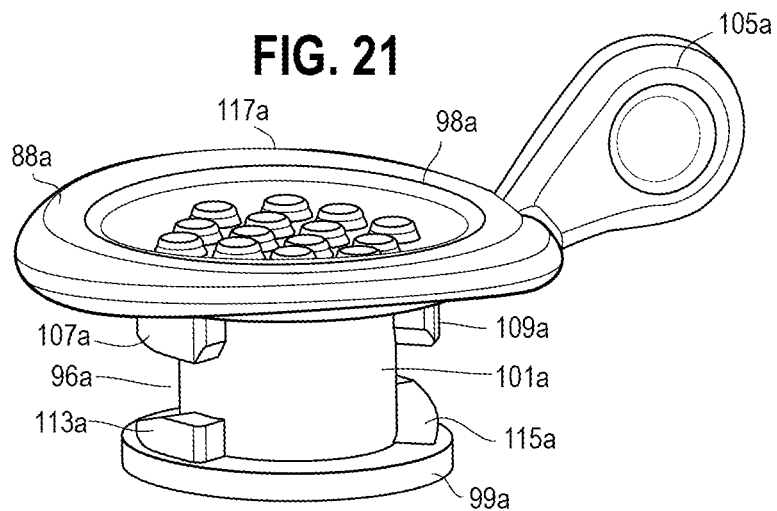
FIGS. 21 and 22 are perspective views of the button of FIG. 1 in accordance with an embodiment.
Figure 22:
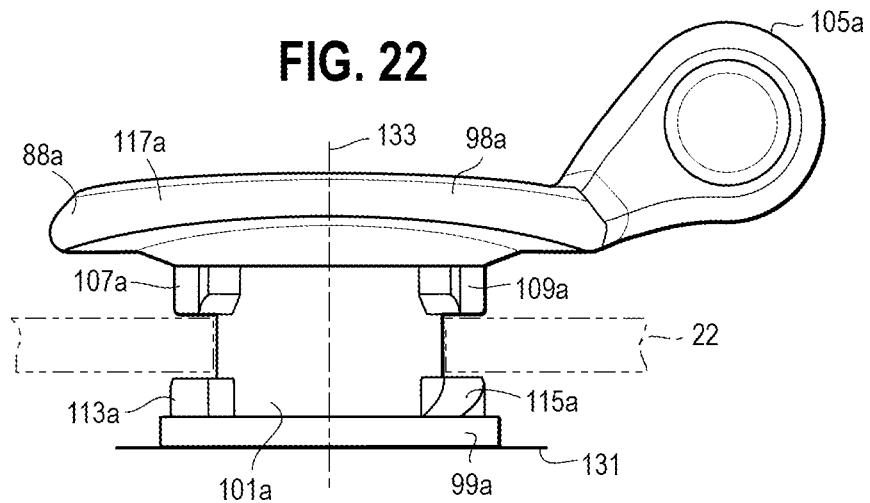
Figure 23:
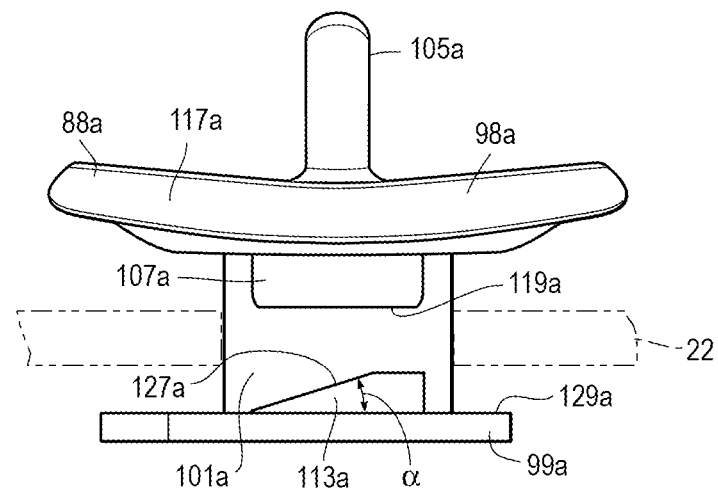
FIG. 23 is a side view of the button of FIG. 21.

Referring to FIGS. 21-23, a first embodiment of the button 88a is shown. The button 88a includes a first end portion 98a and a second end portion 99a and a middle portion 101a extending between the first end portion 98a and the second end portion 99a. The first end portion 98a may include a main portion 117a and an extension 105a extending outwardly from an outer edge of the main portion 117a. In some embodiments, the main portion 117a and the second end portion 99a may have a generally disk shape, and the main portion 117a may have a greater dimension (e.g., diameter) than the dimension (e.g., diameter) of the second end portion. The middle portion 101a may have a generally tubular configuration. The middle portion 101a may include a first upper block 107a and a second upper block 109a that are spaced apart about 180 degrees. The middle portion 101a may also include a first lower block 113a and a second lower block 115a that are spaced apart about 180 degrees.

The first upper block 107a and the first lower block 113a may be at least partially vertically aligned, the second upper block 109a and the second lower block 115a may be at least partially vertically aligned such that a groove 96a is formed between the first upper block 107a and the first lower block 113a and between the second upper block 109a and the second lower block 115a. Referring to FIG. 22, vertical and vertically are used to describe a direction that is generally vertical to a surface 131 on which the second end portion 99a (or 99b in the second embodiment of the button 88b) rests upon, which is generally parallel to a longitudinal axis 133 of the middle portion 101a (or 101b in the second embodiment of the button 88b).

As discussed above, when the button 88a is in the first position 102 (e.g., as shown in FIG. 22), at least a portion of the housing 22 is received within the groove 96a. As discussed above, as shown in FIG. 23, rotating the button 88a about 90 degrees allows the portion of the housing 22 received within the groove 96a to move out of the groove 96a. As shown, the first upper block 107a and the second upper block 109a may have the same/similar configuration, and the first lower block 113a and the second lower block 115a may have the same/similar configuration. In this embodiment, as shown in FIG. 23, the lower surface 119a of the first upper block 107a may be generally horizontal (e.g., parallel to the upper surface 129a of the second end portion 99a), and the upper surface 127a of the first lower block 113a may have a slope extending to the upper surface 129a of the second end portion 99a at an angle α. The angle α may be between about 5 degrees and about 45 degrees. Referring to FIG. 22, horizontal and horizontally are used to describe a direction that is generally parallel to the surface 131 on which the second end portion 99a (or 99b in the second embodiment of the button 88b) rests upon, which is generally vertical to the longitudinal axis 133 of the middle portion 101a (or 101b in the second embodiment of the button 88b).

Referring to FIGS. 2-5, the first embodiment of the button 88a allows the button 88a to be rotated in the counterclockwise direction (e.g., in the perspective of FIG. 2) to move gradually from the first position 102 to the second position 103. In the first position 102, the extension 105a may be pointing downwards, which may act as an indication that the button 88a is in the default state and cannot be pressed to deliver pressurized fluid or therapeutic agent 38. When the button 88a is in the second position 103, rotating the button 88a in the clockwise direction (e.g., in the perspective of FIG. 2) may move the button 88a gradually back to the first position 102. It will be appreciated that the configuration (e.g., the angle α, the dimension) of the first and second upper blocks 107a and 109a and the first and second lower blocks 113a and 115a may be varied as desired and/or needed, without departing from the scope of the present invention, such that the button 88a may be rotated between about 0 and about 360 degrees.

Referring to FIGS. 24-26, a second embodiment of the button 88b is shown. The button 88b includes a first end portion 98b and a second end portion 99b and a middle portion 101b extending between the first end portion 98b and the second end portion 99b. The first end portion 98b may include a main portion 117b and an extension 105b extending outwardly from an outer edge of the main portion 117b. In some embodiments, the main portion 117b and the second end portion 99b may have a generally disk shape, and the main portion 117b may have a greater dimension (e.g., diameter) than the dimension (e.g., diameter) of the second end portion. The middle portion 101b may have a generally tubular configuration. The middle portion 101b may include a first upper block 107b and a second upper block 109b that are spaced apart about 180 degrees. The middle portion 101b may also include a first lower block 113b and a second lower block 115b that are spaced apart about 180 degrees.

The first upper block 107b and the first lower block 113b may be at least partially vertically aligned, the second upper block 109b and the second lower block 115b may be at least partially vertically aligned such that a groove 96b is formed between the first upper block 107b and the first lower block 113b and between the second upper block 109b and the second lower block 115b.

As discussed above, when the button 88b is in the first position 102 (e.g., as shown in FIG. 25), at least a portion of the housing 22 is received within the groove 96b. As discussed above, as shown in FIG. 26, rotating the button 88b about 90 degrees allows the portion of the housing 22 received within the groove 96b to move out of the groove 96b. As shown, the first upper block 107b and the second upper block 109b may have the same/similar configuration, and the first lower block 113b and the second lower block 115b may have the same/similar configuration. In this embodiment, as shown in FIG. 26, the lower surface 119b of the first upper block 107b may be generally horizontal (e.g., parallel to the upper surface 129b of the second end portion 99b), and the upper surface 127b of the first lower block 113b may be generally horizontal (e.g., parallel to the upper surface 129b of the second end portion 99b), such that the lower surface 119b of the first upper block 107b may be generally parallel to the upper surface 127b of the first lower block 113b.

Referring to FIGS. 2-5 and 24-26, the second embodiment of the button 88b allows the button 88b to be rotated in any of the counterclockwise direction and the clockwise direction (e.g., in the perspective of FIG. 2) to move from the first position 102 to the second position 103. A tactile feedback (e.g., click sound) may be provided once the button 88b arrives the second position 103. In the first position 102, the extension 105b may be pointing downwards, which may act as an indication that the button 88b is in the default state and cannot be pressed to deliver pressurized fluid or therapeutic agent 38. When the button 88b is in the second position 103, rotating the button 88a in any of the counterclockwise direction and the clockwise direction (e.g., in the perspective of FIG. 2) may move the button 88a back to the first position 102. The configuration of the button 88a/88b may be varied, as desired and/or needed, without departing from the scope of the present invention, as long as the intended function/purpose/use discussed above may be achieved.

In use, with the catheter 90 connected to the outlet port 128 of the second valve 43, the user may actuate the pressure source 68 (e.g., by manipulating the actuator 26). To deliver the pressurized fluid without the therapeutic agent 38, the user may actuate the first valve 80 by rotating the button 88 about 90 degrees such that the button 88 is moved proximally from the first position 102 (e.g., default state) to the second position 103 (e.g., activated state), as discussed above. This allows the pressurized fluid to flow through the first valve 80 and into the catheter 90 absent delivery of the therapeutic agent 38, without the need of depressing the button 88. Then the user may insert the catheter 90 into the cavity of a patient (e.g., into a scope extending into the cavity of the patient) until it reaches the target site (e.g., when the distal end of the catheter 90 exits the scope).

To deliver the therapeutic agent 38, the user may transition the second valve 43 from the first state 45 to the second state 47, as discussed above. Then by depressing the button 88 to move the button 88 from the second position 103 to the third position 104, the first valve 80 is actuated to allow the pressurized fluid to flow through the first valve 80, into the container 30, and urge the therapeutic agent 38 in the container 30 through the catheter 90. By pressing and holding the button 88 for a desired number of times (e.g., three times), a desired number of shots (e.g. three shots) of therapeutic agent 38 may be delivered. After a desired amount of the therapeutic agent 38 has been delivered, the user may release the button 88, transition the second valve 43 back to the first state 45, and rotate the button 88 back to the first position 102, as discussed above. By releasing the button 88, the pressurized fluid will be delivered through the catheter 90 absent delivery of the therapeutic agent 38.

While various embodiments of the invention have been described, the invention is not to be restricted except in light of the attached claims and their equivalents. Moreover, the advantages described herein are not necessarily the only advantages of the invention and it is not necessarily expected that every embodiment of the invention will achieve all of the advantages described.

I claim:

1. A system suitable for delivering a therapeutic agent to a target site, the system comprising:
    a container for holding a therapeutic agent;
    a pressure source having pressurized fluid, the pressure source in selective fluid communication with at least a portion of the container;
    a catheter in selective fluid communication with the container and configured for delivery of the therapeutic agent or the pressurized fluid to a target site;
    a first valve connected between the pressure source and the container; and
    a button configured to selectively activate the first valve to deliver the therapeutic agent or the pressurized fluid without the therapeutic agent,
    wherein the button is movable among a first position, a second position, and a third position,
    wherein when the button is in the first position, the first valve is configured to prevent delivery of the therapeutic agent through the catheter and prevent delivery of the pressurized fluid through the catheter,
    wherein rotation of the button allows the first valve to move the button to the second position, which allows delivery of the pressurized fluid without the therapeutic agent through the catheter, and
    wherein when the button is in the third position, the first valve is configured to allow delivery of the therapeutic agent through the catheter.

2. The system of claim 1, further comprising a housing configured to securely retain the container,
    wherein when the button is in the first position, at least a portion of the housing limits the button to a rotational movement.

3. The system of claim 2, wherein when the button is rotated substantially 90 degrees from the first position, the housing allows a linear movement of the button, which allows a spring of the first valve to move the button from the first position to the second position.

4. The system of claim 1, wherein when the button is in the second position, the first valve is configured to allow the pressurized fluid in the pressure source to flow through the first valve and into the catheter absent delivery of the therapeutic agent, and
    wherein when the button is in the third position, the first valve is configured to allow the pressurized fluid in the pressure source to flow through the first valve, into the container, and urge the therapeutic agent in the container through the catheter.

5. The system of claim 1, wherein when the button is in the second position, the button is biased to the second position without external force.

6. The system of claim 1, wherein when the button is in the second position, the button can be moved to the third position by pressing and holding, and by releasing the button, the button returns to the second position.

7. A system suitable for delivering a therapeutic agent to a target site, the system comprising:
a container for holding a therapeutic agent;
a pressure source having pressurized fluid, the pressure source in selective fluid communication with at least a portion of the container;
a catheter in selective fluid communication with the container and configured for delivery of the therapeutic agent or the pressurized fluid to a target site; and
a button configured to move between a default state and an activated state,
wherein when the button is in the default state, delivery of the therapeutic agent and delivery of the pressurized fluid both are not allowed by pressing the button, and
wherein when the button is in the activated state, the button is configured to selectively allow delivery of the pressurized fluid without the therapeutic agent or delivery of the therapeutic agent.

8. The system of claim 7, wherein the button is configured to be rotated between the default state and the activated state.

9. The system of claim 7, wherein when the button is in the activated state, delivery of the pressurized fluid without the therapeutic agent is allowed without the button being pressed.

10. The system of claim 7, wherein when the button is in the activated state, delivery of the therapeutic agent is allowed when the button is pressed.

11. The system of claim 10, wherein when the button is released, delivery of the therapeutic agent is prevented, while delivery of the pressurized fluid without the therapeutic agent is allowed.

12. The system of claim 7, further comprising a housing configured to securely retain the container, wherein the button includes a groove, and when the button is in the default state, at least a portion of the housing is received within the groove of the button, which limits the button to a rotational movement.

13. The system of claim 7, further comprising a first valve connected between the pressure source and the container, wherein rotation of the button substantially 90 degrees from the default state allows the first valve to move the button from the default state to the activated state.

14. The system of claim 13, wherein when the button is in the activated state and not being pressed, the first valve is configured to allow the pressurized fluid in the pressure source to flow through the first valve and into the catheter absent delivery of the therapeutic agent, and wherein when the button is in the activated state and being pressed, the first valve is configured to allow the pressurized fluid in the pressure source to flow through the first valve, into the container, and urge the therapeutic agent in the container through the catheter.

15. A system suitable for delivering a therapeutic agent to a target site, the system comprising:
a container for holding a therapeutic agent;
a pressure source having pressurized fluid, the pressure source in selective fluid communication with at least a portion of the container;
a catheter in selective fluid communication with the container and configured for delivery of the therapeutic agent or delivery of the pressurized fluid without the therapeutic agent to a target site;
a first valve connected between the pressure source and the container; and
a housing configured to securely retain the container and rotationally support a button, wherein the button is configured to selectively actuate the first valve to deliver the therapeutic agent or deliver the pressurized fluid without the therapeutic agent.

16. The system of claim 15,
wherein the first valve further comprises:
a main body including a proximal end, a distal end, and an inner lumen extending between the proximal end and the distal end;
a piston extending between a distal end portion and a proximal end portion, wherein the piston is slidably movable along a length of the inner lumen of the main body; and
a spring disposed in the inner lumen of the main body,
wherein the spring is connected to the distal end portion of the piston,
wherein the button is coupled to the proximal end portion of the piston,
wherein the main body includes an inlet port, a first outlet port, and a second outlet port, wherein the piston includes spaced apart first and second grooves disposed on an outer surface of the piston, wherein the piston further includes a valley disposed between the first and second grooves on the outer surface of the piston, and wherein the valley is configured for receiving a sealing member configured for selectively closing the inlet port, the first outlet port, or the second outlet port.

17. The system of claim 16, wherein the button is movable among a first position, a second position, and a third position, wherein rotation of the button allows the spring to move the button proximally from the first position to the second position, wherein when the button is in the first position, delivery of the therapeutic agent and delivery of the pressurized fluid both are prevented, and wherein when the button is in the second position, the first valve allows the pressurized fluid in the pressure source to flow through the first valve and into the catheter absent delivery of the therapeutic agent.

18. The system of claim 17, wherein when the button is in the second position, the spring allows the button to be depressed to move distally from the second position to the third position, and wherein when the button is in the third position, the first valve allows the pressurized fluid in the pressure source to flow through the first valve, into the container, and urge the therapeutic agent in the container through the catheter.

19. The system of claim 17, wherein when the button is in the first position, the sealing member disposed in the valley is axially aligned with the inlet port, such that the pressurized fluid does not flow into the first valve, and wherein when the button is in the second position, the sealing member is axially offset from the inlet port and the second outlet port, but the sealing member is axially aligned with the first outlet port, such that the pressurized fluid flows into the first valve via the inlet port, into the second groove, and exits the first valve via the second outlet port.

20. The system of claim 17, wherein when the button is in the third position, the sealing member is axially offset from the inlet port and the first outlet port, but the sealing member is axially aligned with the second outlet port, such that the pressurized fluid flows into the first valve via the inlet port, into the first groove, and exits the first valve via the first outlet port.

* * * * *